(12) United States Patent
Yan et al.

(10) Patent No.: US 11,521,804 B2
(45) Date of Patent: Dec. 6, 2022

(54) ULTRA-THIN LITHIUM-ION CAPACITOR WITH ULTRA-HIGH POWER PERFORMANCE

(71) Applicant: General Capacitor, LLC, Tallahassee, FL (US)

(72) Inventors: Jin Yan, Tallahassee, FL (US); Wanjun Ben Cao, Tallahassee, FL (US); Xujie Chen, Tallahassee, FL (US)

(73) Assignee: SPEL TECHNOLOGIES PRIVATE LIMITED, Prune (IN)

( * ) Notice: Subject to any disclaimer, the term of this patent is extended or adjusted under 35 U.S.C. 154(b) by 367 days.

(21) Appl. No.: 16/353,936

(22) Filed: Mar. 14, 2019

(65) Prior Publication Data

US 2019/0287736 A1 Sep. 19, 2019

Related U.S. Application Data

(60) Provisional application No. 62/642,890, filed on Mar. 14, 2018.

(51) Int. Cl.
*H01G 11/06* (2013.01)
*H01G 11/32* (2013.01)
(Continued)

(52) U.S. Cl.
CPC .......... *H01G 11/06* (2013.01); *H01G 11/32* (2013.01); *H01G 11/52* (2013.01); *H01G 11/60* (2013.01); *H01G 11/84* (2013.01); *H01G 11/86* (2013.01)

(58) Field of Classification Search
None
See application file for complete search history.

(56) References Cited

U.S. PATENT DOCUMENTS

2016/0126023 A1* 5/2016 Cao ............... H01G 11/06 361/502
2016/0307706 A1* 10/2016 Cao ............... H01G 11/50
(Continued)

OTHER PUBLICATIONS

Boltersdorf, Jonathan, et al., "Electrochemical performance of lithium-ion capacitors evaluated under high temperature and high voltage stress using redox stable electrolytes and additives", Journal of Power Sources, vol. 373, (2018), 20-30.
(Continued)

*Primary Examiner* — Dion R. Ferguson
(74) *Attorney, Agent, or Firm* — Schwegman Lundberg & Woessner, P.A.

(57) ABSTRACT

Ultra-thin lithium ion capacitors with ultra-high power performance are provided. Ultra-thin electrodes and ultra-thin lithium films can be used for the ultra-thin lithium ion capacitor. A lithium ion capacitor can include a first positive electrode and a second positive electrode, a negative electrode disposed between the first positive electrode and the second positive electrode, a first lithium film disposed between the first positive electrode and the negative electrode, and a second lithium film disposed between the second positive electrode and the negative electrode. Each of the first and second lithium films can include an electrolyte. In addition, at least one separator can be provided between the first positive electrode and the first lithium film, and at least one separator can be provided between the second positive electrode and the second lithium film.

18 Claims, 24 Drawing Sheets

(51) Int. Cl.
  *H01G 11/86* (2013.01)
  *H01G 11/60* (2013.01)
  *H01G 11/52* (2013.01)
  *H01G 11/84* (2013.01)

(56) References Cited

U.S. PATENT DOCUMENTS

| | | | |
|---|---|---|---|
| 2017/0062142 A1* | 3/2017 | Gadkaree | H01G 11/84 |
| 2017/0301485 A1* | 10/2017 | Cao | H01G 11/06 |
| 2018/0374656 A1* | 12/2018 | Yan | H01G 11/38 |
| 2019/0027321 A1* | 1/2019 | Kusuzaka | H01M 4/1393 |
| 2020/0303706 A1* | 9/2020 | Smith | H01G 11/52 |

OTHER PUBLICATIONS

Cao, W. J., et al., "Development and characterization of Li-ion capacitor pouch cells", Journal of Power Sources, vol. 257, (2014), 388-393.

Cao, W. J., et al., "High Performance Li-Ion Capacitor Laminate Cells Based on Hard Carbon/Lithium Stripes Negative Electrodes", Journal of The Electrochemical Society, 164(2), (2017), A93-A98.

Cao, W. J., et al., "Li-ion capacitors with carbon cathode and hard carbon/stabilized lithium metal powder anode electrodes", Journal of Power Sources, vol. 213, (2012), 180-185.

Cao, W. J., et al., "The Effect of Cathode and Anode Potentials on the Cycling Performance of Li-Ion Capacitors", Journal of The Electrochemical Society,160(9), (2013), A1572-A1576.

Emadi, Ali et al., "Power Electronics and Motor Drives in Electric, Hybrid Electric, and Plug-In Hybrid Electric Vehicles", IEEE Transactions on Industrial Electronics, 55(6), (Jun. 2008), 2237-2245.

Guarnieri, Massimo, "Looking back to electric cars", 2012 Third IEEE HISTory of ELectro-technology CONference (HISTELCON), (Sep. 2012), 6 pgs.

Lee, Seung W., et al., "Nanostructured carbon-based electrodes: bridging the gap between thin-film lithium-ion batteries and electrochemical capacitors", Energy & Environmental Science, 4(6), (2011), 1972-1985.

Qu, Deyang, et al., "Studies of activated carbons used in double-layer capacitors", Journal of Power Sources, 74(1), (Jul. 1998), 99-107.

Simon, Patrice, et al., "Materials for electrochemical capacitors", Nature Materials, vol. 7, (2008), 845-854.

Yan, J., et al., "Constructing High Energy and Power Densities Li-Ion Capacitors Using Li Thin Film for Pre-Lithiation", Journal of The Electrochemical Society, 164(9), (2017), A2164-A2170.

Yoo, Eunjoo, et al., "Large Reversible Li Storage of Graphene Nanosheet Families for Use in Rechargeable Lithium Ion Batteries", Nano Letters, 8(8), (Aug. 2008), 2277-2282.

* cited by examiner

ULTRA-THIN LITHIUM-ION CAPACITOR WITH ULTRA-HIGH POWER PERFORMANCE

BACKGROUND

Many electric and hybrid electric vehicles use lithium-ion batteries (LIBs), and the number of electric and hybrid electric vehicles is expected to grow larger in the next few years. To create a high energy and high power density storage device, lithium-ion capacitors (LICs) have become a hot topic in the last decade. An LIC is a hybrid electrochemical energy storage device that combines the intercalation mechanism of a LIB based negative electrode (NE) with an activated carbon positive electrode (PE), which was originally used in an electric double-layer capacitor (EDLC). LICs also utilize LIB's NE including graphite, soft carbon, and hard carbon. An LIC can solve the problem of short cycle life time of LIBs and provide high power output as an EDLC would at the same time. However, the energy density of LICs still cannot compare with that of LIBs. Thus, some researchers considered combining an LIC and an LIB together. In this way, the LIC could also gain a very large market all over the world. Moreover, due to the excellent power and cycling performance of an LIC, it may also be used as a power supply for signal receiving and sending tools. In some special circumstances, signal transmission devices are in mini size, so the power supply device needs to be small as well. However, enough energy and power are still needed to accomplish the work, and the repeatability of signal transmission work needs to be ensured.

BRIEF SUMMARY OF THE INVENTION

Embodiments of the subject invention provide novel and advantageous ultra-thin lithium-ion capacitors, and methods of manufacturing the same, that provide ultra-high power performance and save the space of thick lithium metal.

In an embodiment, a lithium ion capacitor can comprise a first positive electrode and a second positive electrode, a negative electrode disposed between the first positive electrode and the second positive electrode, a first lithium film disposed between the first positive electrode and the negative electrode, and a second lithium film disposed between the second positive electrode and the negative electrode. Each of the first and second lithium films can include an electrolyte. In addition, at least one separator can be provided between the first positive electrode and the first lithium film, and at least one separator can be provided between the second positive electrode and the second lithium film. Each separator present can be or can include, for example, cellulose, polypropylene (PP), and/or polyethylene (PE) based material(s). The separators provide electrical insulation between the electrodes to prevent electrical shorts. The separators may be soaked in an ionically conductive electrolyte that facilitates ion transport between he anode and cathode electrodes. In a further embodiment, at least one separator can be provided on the outside of the first positive electrode (on the side facing away from the negative electrode), and at least one separator can be provided on the outside of the second positive electrode (on the side facing away from the negative electrode); these outside separators can be in addition to any separators provided between the positive electrodes and the lithium films.

In another embodiment, a method for manufacturing a lithium ion capacitor can comprise: preparing first and second positive electrodes; preparing a negative electrode having a first surface facing the first positive electrode and a second surface facing the second positive electrode; forming a first lithium film on the first surface of the negative electrode; forming a second lithium film on the second surface of the negative electrode; forming a sandwich cell by assembling the first positive electrode to the first lithium film and the second positive electrode to the second lithium film; and soaking the sandwich cell with an electrolyte. The method can further include preparing at least one first separator and/or at least one second separator before forming the sandwich cell. The at least one first separator can be formed or assembled to be between the first positive electrode and the first lithium film, and the at least one second separator can be formed or assembled to be between the second positive electrode and the second lithium film. This can be done before or while the sandwich cell is formed. Each (first and second) separator present can be or can include, for example, cellulose, polypropylene (PP), and/or polyethylene (PE) based material(s). In a further embodiment, the method can also include preparing at least one third separator and forming and assembling it on the outside of the first positive electrode (on the side facing away from the negative electrode), and preparing at least one fourth separator and forming and assembling it on the outside of the second positive electrode (on the side facing away from the negative electrode); these outside separators can be in addition to any separators prepared and provided between the positive electrodes and the lithium films.

DETAILED DISCLOSURE OF THE INVENTION

Embodiments of the subject invention provide novel and advantageous ultra-thin lithium-ion capacitors (LICs), and methods of manufacturing the same, that use a pre-loaded ultra-thin lithium film directly on the surfaces of a negative electrode before soaking in organic electrolyte, thereby providing ultra-high power performance and saving the space of thick lithium metal.

Embodiments of the subject invention provide an ultra-thin paper-like LIC with ultra-high power performance and long-life performance. Ultra-thin electrodes are fabricated first before the anode ultra-thin lithium loading and cell assembling processes. Embodiments also provide first assembly methods.

LICs of embodiments of the subject invention can have a total stack core thickness (excluding the thickness of any cell case) of less than, or no more than, any of the following values (all numerical values are in millimeters (mm)): 1.0, 0.9, 0.8, 0.7, 0.6, 0.5, 0.4, 0.3, 0.29, 0.28, 0.27, 0.26, 0.25, 0.24, 0.23, or 0.22. For example, the total stack core thickness can be no more than 1.0 mm, no more than 0.5 mm, no more than 0.3 mm, or even no more than 0.22 mm. LICs of embodiments of the subject invention can have a total thickness (including the thickness of any cell case) of less than any of the following values (all numerical values are in millimeters mm)): 1.5, 1.4, 1.3, 1.2, 1.1, 1.0, 0.9, 0.8, 0.7, 0.6, 0.5, 0.4, 0.39, 0.38, or 0.371. For example, the total thickness (including the thickness of any cell case) can be no more than 1.2 mm, no more than 1.0 mm, no more than 0.4 mm or even no more than 0.371 mm.

Figure 1:
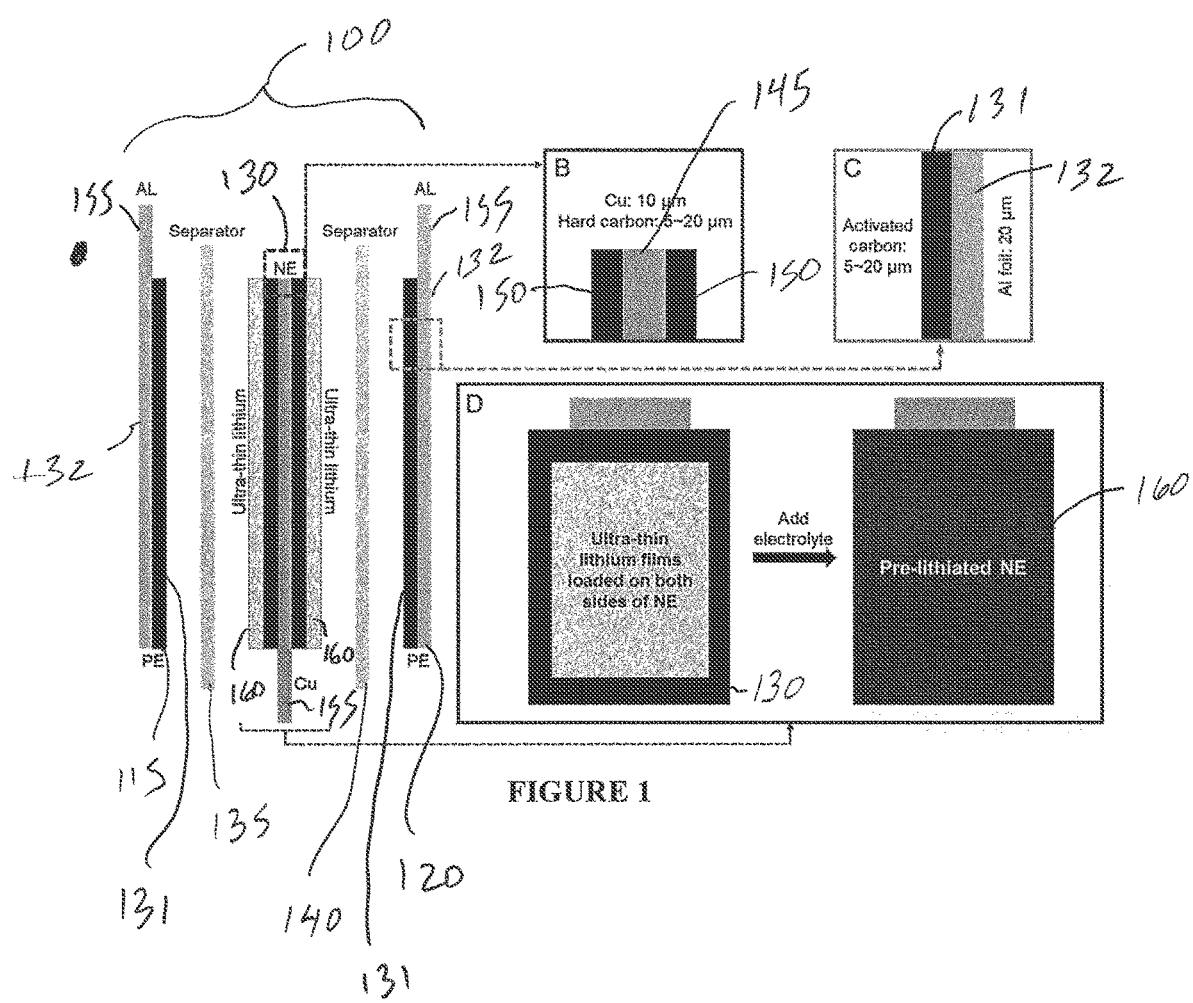
FIG. 1 shows a cross-sectional view of an ultra-thin lithium-ion capacitor cell according to an embodiment of the subject invention.

FIG. 1 shows an exploded block diagram view of a stack core of an ultra-thin LIC cell 100 according to an embodiment of the subject invention. Portions of the cell 100 are shown in further detail in inserts at B and C. Referring to FIG. 1, a novel ultra-thin LIC can have a very small thickness (e.g., a 0.37 mm total thickness including 0.152 mm thickness of the cell case (e.g., aluminum (Al) laminate films)). That is, the stack core of the ultra-thin LIC laminate cell can have a thickness of 0.218 mm. In this 0.218 mm thickness stack, there are two single-sided positive electrodes (PEs) 115 and 120, one ultra-thin lithium film pre-loaded double-sided negative electrode (NE) 130, and separator layers 135, 140 (e.g., four layers of separators). All cell components are drawn and marked except that two outside separators can also be included (not shown).

The PE can be made with a mixture of activated carbon (AC) 131, carbon black (CB), and one or more binders (e.g., carboxymethyl cellulose (CMC) and styrene-butadiene rubber (SBR)). The slurry mixture (deionized water is the solvent for slurry) can include AC, CB, SBR, and CMC with a mass ratio of 91:5:3:1. After the slurry is prepared, it is coated onto a substrate 132 (e.g., an aluminum (Al) foil substrate), with a thickness of for example 20 μm, by a doctor blade method. Then the electrodes are pressed through a roll press (e.g., with a pressure of 3-4 tons).

For the NE, the slurry mixture can be made of hard carbon (HC) having a particle size (D50) of 2 μm (or about 2 μm) and SBR/CMC as binders, and this can be in a mass ratio of 96:3:1 (HC:SBR:CMC). After the slurry is prepared, it can be coated onto a substrate (e.g., a copper (Cu) foil substrate) 145, with a thickness of for example 10 μm). Then, a 5-20 μm HC active layer 150 can be coated on both sides of the substrate as shown in a blown-up insert at B. HC has a 50% porosity. The NE can have a size of, for example, 81.5 mm×49 mm, while the PE can have a size of, for example, 80 mm×48 mm, though embodiments are not limited thereto. Both the NE and the PE can have a tab 155 (e.g., a 15 mm long tab) for welding.

A blown-up insert at C shows a cross-sectional view of the PE. An AC electrode active layer can have a thickness of 5-20 μm. Before cell assembly, ultra-thin lithium films (e 10-30 μm) can be pre-loaded on both sides of NEs for uniform coverage, which can help with the NE's pre-lithiation during electrolyte soaking process.

An insert at D shows the lithium loading concept and how NE can be pre-lithiated after adding an electrolyte to form a thin lithium film 160 on both sides of the NE. All layers can be stacked in a dry room (e.g., with a −40° C. dew point), and the soaking process can be finished in an inert (e.g., argon-filled) container (e.g., a glovebox). The standard electrolyte can be 1 M $LiPF_6$ in ethylene carbonate (EC): dimethyl carbonate (DMC) at a ratio of 1:1 by weight. Low temperature organic electrolytes can also be used, and will be discussed further for conducting a comparison in the Example section below. Such a low temperature electrolyte can be made using 1 M $LiPF_6$ in ethylene carbonate (EC): ethyl methyl carbonate (EMC):methyl butyrate (MB) (20: 20:60 by volume)+0.1 M lithium difluoro (oxalate) borate (LiDFOB).

After cell formation, degassing and final seal, initial capacitance and equivalent series resistance (C&ESR)

results can be collected by charging and discharging the cell (e.g., in the range of 2.2 V-3.8 V with a constant current of 0.1 A (50 C rate)). Charging and discharging can be conducted for, for example, three cycles with a rest time (e.g., a 15 second rest time) between each charge and discharge.

In an embodiment, the manufacturing method for an LIC comprises: preparing first and second positive electrodes; preparing a negative electrode having a first surface facing the first positive electrode and a second surface facing the second positive electrode; forming a first lithium film on the first surface of the negative electrode; forming a second lithium film on the second surface of the negative electrode; forming a sandwich cell by assembling the first positive electrode to the first lithium film and the second positive electrode to the second lithium film; and soaking the sandwich cell with an electrolyte. The method can further include preparing at least one first separator and/or at least one second separator before forming the sandwich cell. The at least one first separator can be formed or assembled to be between the first positive electrode and the first lithium film, and the at least one second separator can be formed or assembled to be between the second positive electrode and the second lithium film. This can be done before or while the sandwich cell is formed. Each (first and second) separator present can be or can include, for example, cellulose, polypropylene (PP), and/or polyethylene (PE) based material(s). In a further embodiment, the method can also include preparing at least one third separator and forming and assembling it on the outside of the first positive electrode (on the side facing away from the negative electrode), and preparing at least one fourth separator and forming and assembling it on the outside of the second positive electrode (on the side facing away from the negative electrode); these outside separators can be in addition to any separators prepared and provided between the positive electrodes and the lithium films.

LICs according to embodiments of the subject invention provide a novel design of ultra-thin (paper-like) ultra-high power performance LICs through the use of ultra-thin PE and NE, as well as ultra-thin lithium films. According to the Examples discussed below, an ultra-thin LIC can have an average capacitance of 5 F and ESR under 0.25 ohm when satisfying the optimal capacity ratio (0.08-0.2) of PE/NE. A cell can also display a maximum specific power of 343 kW/kg and a maximum power density of 90 kW/L, based on electrode active layers' weight, which is considered ultra-high power performance compared to most available commercialized capacitors and batteries. With related art devices, a cell could only pass 80,000 cycle life testing by charging and discharging from 2.8 V to 3.8 V at a high rate (0.1 A, 50 C rate). However, LICs of embodiments of the subject invention can pass 500,000 long time pulsed cycle life tests, and the ultra-thin LIC cell is still stable in capacity and efficiency. In some other extreme working environments, such as a high temperature float test at maximum operating voltage and low temperature, the ultra-thin LICs of embodiments of the subject invention can still operate and maintain their performance. In addition, cells with a low temperature electrolyte as discussed herein can exhibit significantly improved properties, compared to standard LICs, at extreme low working temperatures (e.g., under −30° C. or even under 40° C.).

A greater understanding of the present invention and it many advantages may be had from the following examples, given by way illustration. The following examples show some of the methods, applications, embodiments and variants of the present invention. They are, of course, not to be considered as limiting the invention. Numerous changes and modifications can be made with respect to the invention.

EXAMPLE 1

An LIC was prepared according to the following manufacturing method: preparing first and second positive electrodes; preparing a negative electrode having a first surface facing the first positive electrode and a second surface facing the second positive electrode; forming a first lithium film on the first surface of the negative electrode; forming a second lithium film on the second surface of the negative electrode; forming a first separator on the first lithium film; forming a second separator on the second lithium film; forming a sandwich cell by assembling the first positive electrode on the first separator and the second positive electrode on the second separator; and soaking the sandwich cell with an electrolyte.

All punched electrodes were dried in a vacuum oven attached to a glovebox for 3 hours at a temperature of 150° C., wherein the mass ratio of PE/NE in the active layer was from 0.4 to 0.6. The ultra-thin 20 μm lithium films (u-Li) as the Li sources were pre-loaded onto the surfaces of the NE. At this time, the ideal Li weight was calculated according to the NE active layer weight such that the ratio of Li weight to NE active layer is in a range of 8% to 10%. The Li film was cut from a 20 μm Li film roll, and then the Li film was cut to u-Li pieces that were loaded (deposited) uniformly on each side of the NE. After that, the u-Li pieces were pressed onto the surfaces of the NE.

The PE and NE were assembled in the dry room to make an LIC two-layer sandwich cell including two single-sided PEs and one double-side NE. The assembled LIC cell was put in the oven attached to the glovebox for 8 hours at a temperature of 90° C.

Next, the glovebox was filled with 3.5 milliliters (ml) of organic electrolyte. First, 1 ml of electrolyte was filled, and allowed to sit for 10 minutes. After that, the rest (2.5 ml) of the electrolyte was filled at one time and it was sealed with a hand sealer in the glovebox.

Then, the LIC cell was soaked with the electrolyte for 24 hours inside the glovebox. The open circuit voltage of the LIC cell was checked by a multimeter at 1 hour, 5 hours, and 24 hours after soaking, and the max voltage among these three values was noted. In addition, the LIC cell was vacuum-sealed by a vacuum sealer.

The LIC cell was charged up to 3.8 V and held at 3.8 V at room temperature for 72 hours. The LIC cell was transferred into a 65° C. oven and held at 3.8 V and 65° C. for 96 hours with a clamp.

To test the electrochemical impedance spectrum (EIS) of cells, Gamry Instruments Reference 3000 Potentiostat/Galvanostat/ZRA was used with 0.01 to $10^6$ Hz frequency and an amplitude of 10 mV. Cycling performance under different currents was researched by charging and discharging cells in a range of 2.8 V-3.8 V with various currents of 0.1 A, 0.2 A, 0.3 A, 0.4 A, and 0.5 A. To meet the requirement of special engineering applications, pulse test and longtime pulsed cycle life tests were also conducted. To test the ultra-thin LIC's DC life under high temperature at maximum operating voltage, the ultra-thin LIC's voltage was held at 3.8 V for more than 2000 hours in a 65° C. oven. Detailed experimental methods are provided below. An Arbin BT-2000 Battery Testing Unit was used for initial tests and cycle life tests. The ultra-thin LIC laminate cell was not clamped all the time during all the electrochemical tests. To explore the particle size of carbon, a field emission scanning electron microscope (SEM) (JEM-ARM200cF) was used. A PE sample was prepared and scanned under a 10 kV condition.

After cell assembly and formation, initial C&ESR data were collected from ultra-thin LICs by charging and discharging cells from 2.2 V to 3.8 V at a high rate (0.1 A, 50 C rate). Although the thickness of electrodes was limited to less than 50 μm, the capacity ratio of PE/NE can still be regarded as a standard to determine cell performance. Moreover, these ultra-thin LICs need to be functional in certain signal sending and receiving applications. For this reason, the optimal capacity ratio of PE/NE can also make sure cells can be durable in long cycling tests. Table 1 shows cell assembly details and initial C&ESR testing results for two groups of cells. Referring to Table 1, group A with a smaller PE/NE active layer capacity ratio (0.1~0.15) and group B with a larger capacity ratio (0.2~0.3) are compared. Group A and group B have a similar range of capacitance, but group A has a smaller ESR (~0.1 ohm) than group B at a high rate. This explains why group A also has a higher maximum specific power (up to 343 kW/kg, based on electrode active layers' weight) and maximum power density (up to 90 kW/L). This comparison shows that the capacity ratio of PE/NE of cell B1 to B4 is not in an optimal range. In addition, this capacity ratio of PE/NE does have influence on the cell's power performance.

To satisfy an ultra-thin cell, the thickness of the electrode needs to be limited. From the particle size shown in FIG. 2D, 5 μm is the smallest thickness limitation PE's active layer can reach.

For this ultra-thin LIC cell, due to the variety of electrodes' thickness, the capacitance of the cell may fall in a range of 2-8 Farads (F). In the cycle life test, one ultra-thin LIC cell with a capacitance of 5 F was chosen. In this way, 0.1 A was used as 50 C rate for cycle life testing. To obtain cycling performance of the ultra-thin LIC, cells were charged and discharged from 2.8 V-3.8 V with a constant current of 0.1 A. After each stage (charge or discharge), there was a 5 second rest time. Here, the cell's cycling properties are shown in FIG. 3. Referring to FIG. 3, after 80,000 cycles, the cell still maintained 93% capacitance and 130% ESR. Discharge/charge capacity was stable at an efficiency of 95%, and energy efficiency was 92% from cycle 1 to 80,000. Therefore, in the range of 2.8 V-3.8 V, paper-thin LICs can realize charge-discharge processes more than 80,000 times without losing its electrochemical performance.

To obtain the cycle life of paper-thin LICs under various extreme high rates, the cell was charged and discharged for 500-600 cycles under constant currents of 0.1 A, 0.2 A, 0.3 A, 0.4 A, and 0.5 A. As discussed above, 0.1 A equals to a 50 C rate for the cell, and this experiment pushed this

TABLE 1

Cell assembly details and initial C&ESR results of testing group A and B

| Example | PE Thickness (μm) | NE Thickness (μm) | Capacity Ratio of PE/NE | C (F) | ESR (Ohm) | Specific Energy (Wh/kg) | Energy Density (Wh/L) | Max. Specific Power (kW/kg) | Max. Power Density (kW/L) |
|---|---|---|---|---|---|---|---|---|---|
| A1 | 42 | 43 | 0.14 | 8.8 | 0.065 | 58 | 19 | 274 | 90 |
| A2 | 34 | 40 | 0.10 | 5.4 | 0.083 | 48 | 13 | 292 | 76 |
| A3 | 35 | 39 | 0.10 | 5.8 | 0.109 | 49 | 14 | 210 | 58 |
| A4 | 30 | 38 | 0.10 | 4.3 | 0.083 | 45 | 11 | 343 | 80 |
| B1 | 34 | 30 | 0.20 | 4.0 | 0.229 | 60 | 10 | 178 | 30 |
| B2 | 50 | 42 | 0.20 | 5.7 | 0.245 | 80 | 12 | 155 | 23 |
| B3 | 35 | 29 | 0.30 | 4.5 | 0.424 | 29 | 11 | 41 | 16 |
| B4 | 47 | 39 | 0.30 | 10.0 | 0.322 | 70 | 22 | 59 | 18 |

Figure 2A:
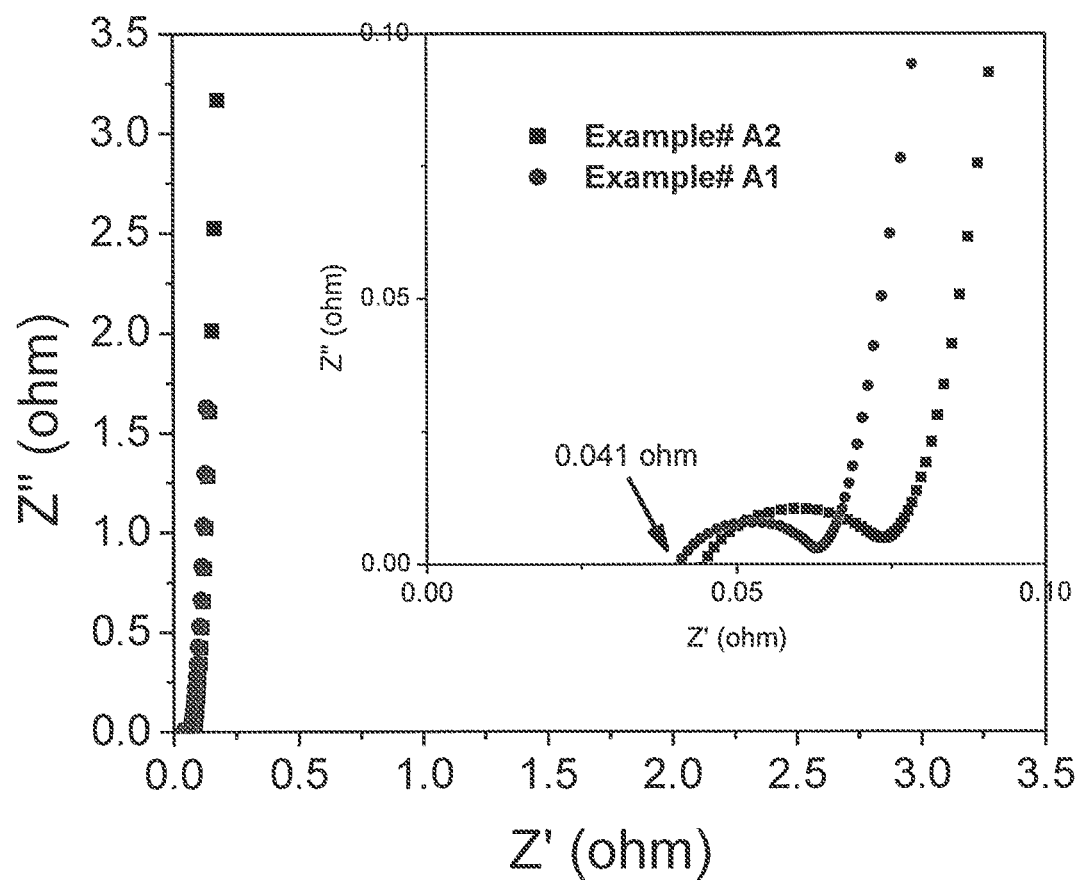
FIG. 2A shows electrochemical impedance spectrum and equivalent series resistance of an ultra-thin lithium-ion capacitor cell according to an embodiment of the subject invention.
Figure 2B:
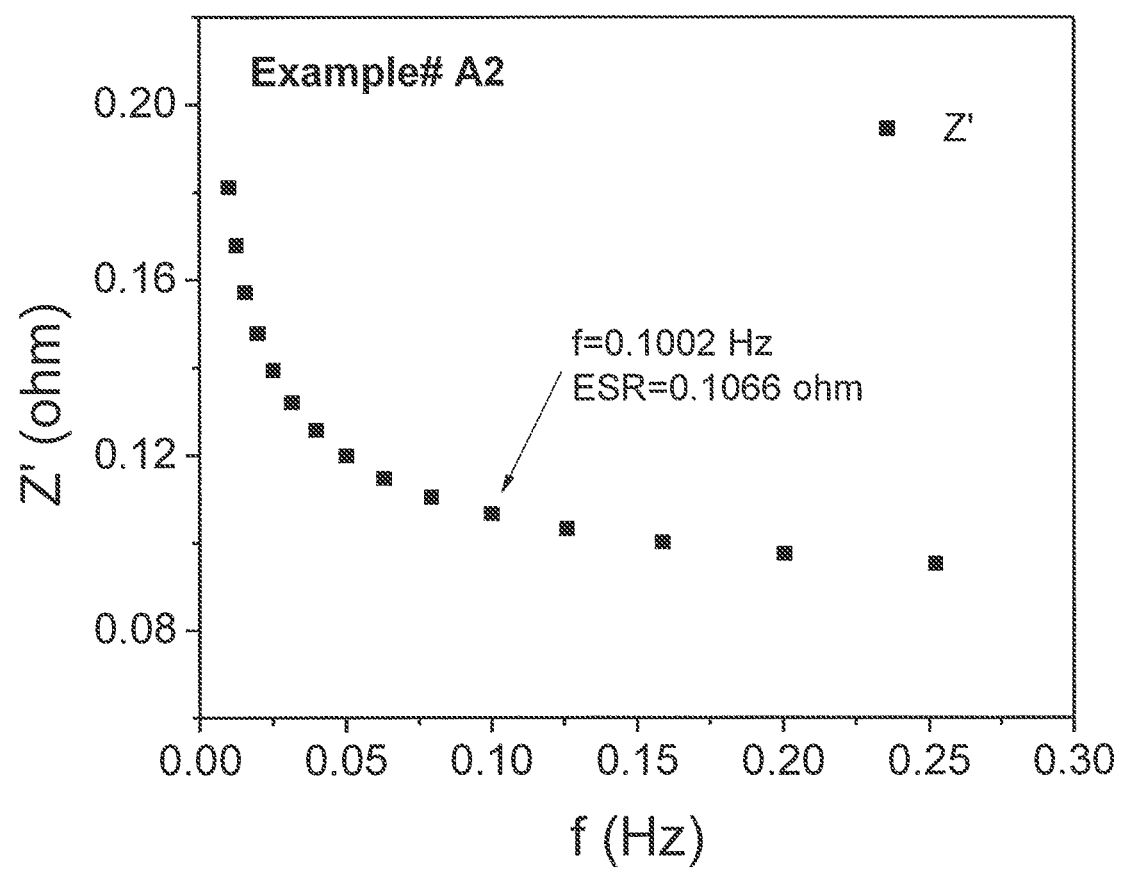
FIG. 2B shows equivalent series resistance under different frequency of an ultra-thin lithium-ion capacitor cell according to an embodiment of the subject invention.
Figure 2C:
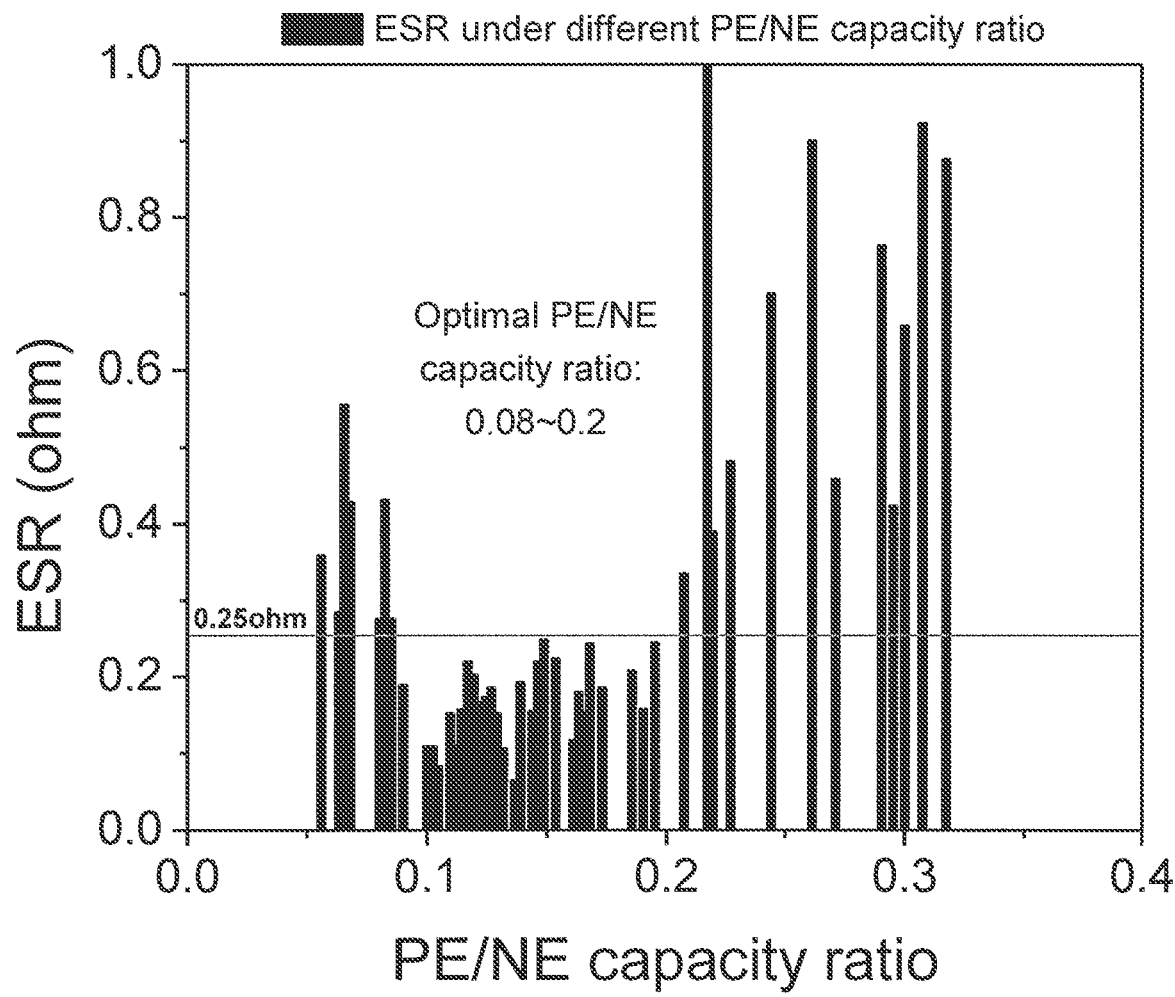
FIG. 2C shows equivalent series resistance under different positive electrode to negative electrode capacity ratio of an ultra-thin lithium-ion capacitor cell according to an embodiment of the subject invention.
Figure 2D:
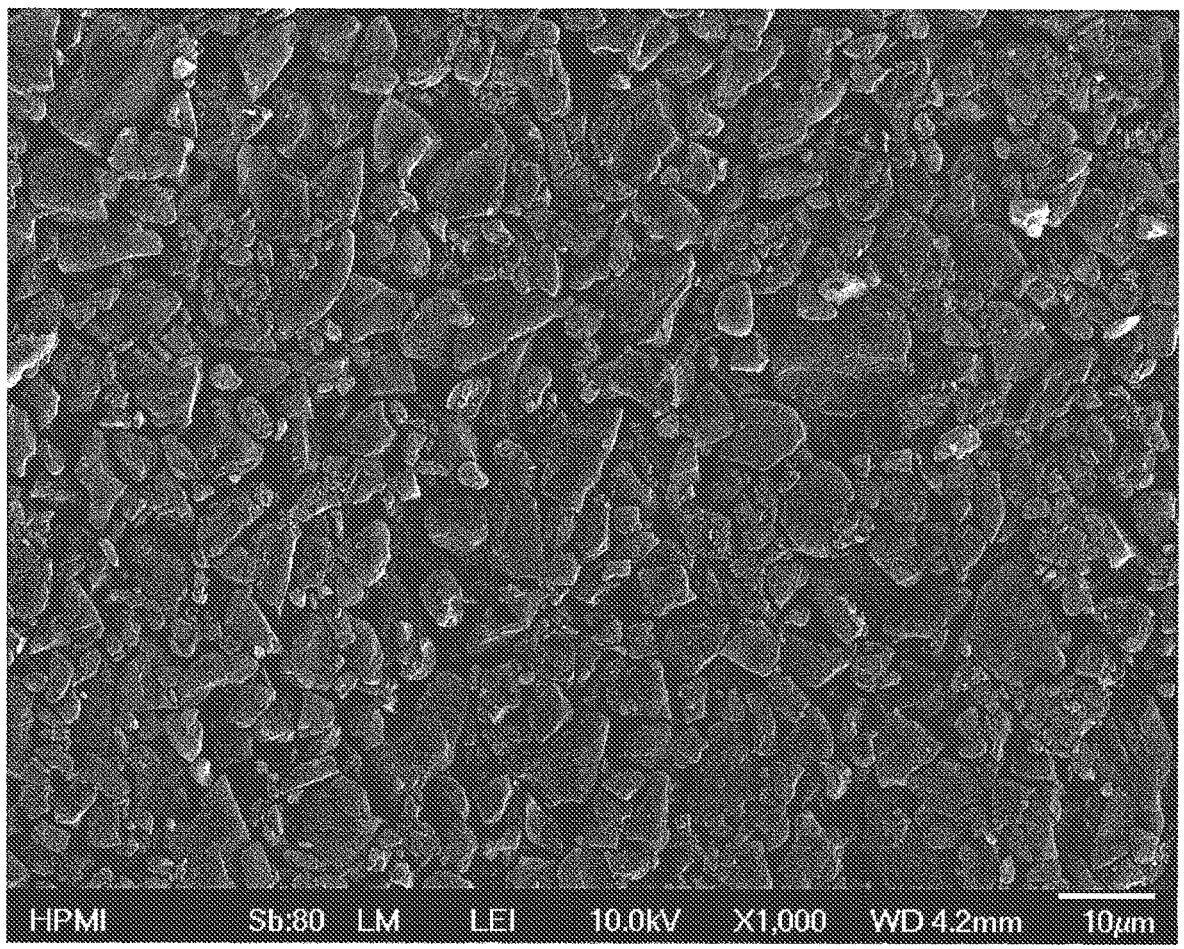
FIG. 2D shows a scanning electron microscope image of an activated carbon of an ultra-thin lithium-ion capacitor cell according to an embodiment of the subject invention.
Figure 3A:
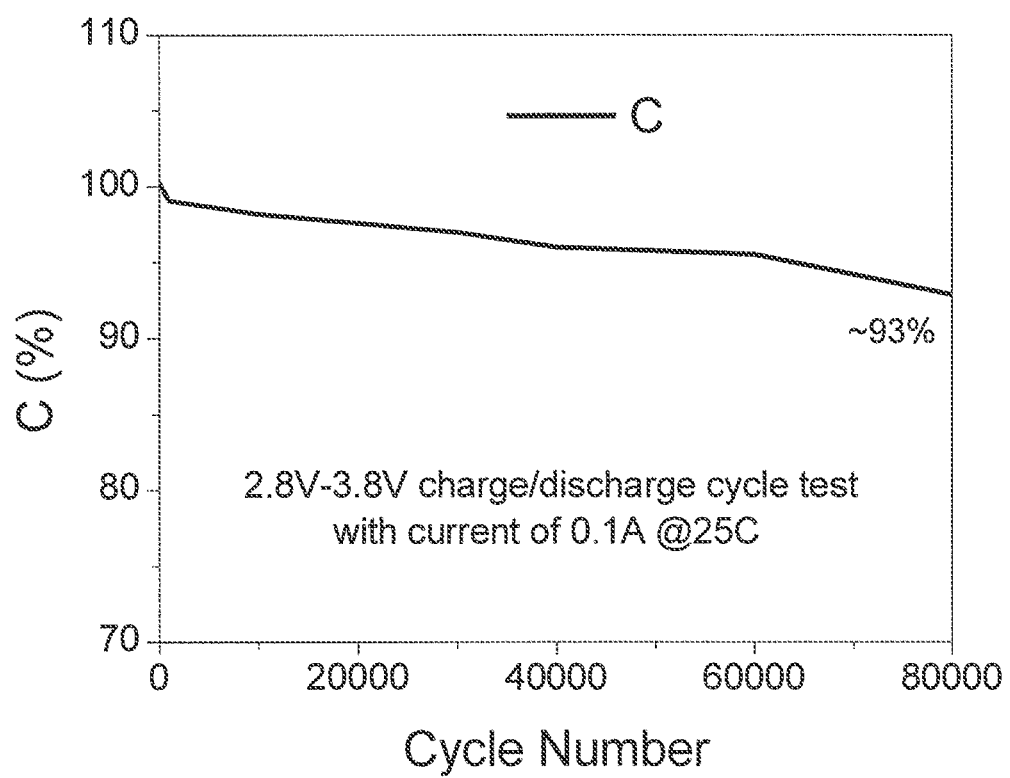
FIG. 3A shows capacitance cycling performance of an ultra-thin lithium-ion capacitor cell under a constant current of 0.1 A charge-discharge from 2.8V to 3.8V.
Figure 3B:
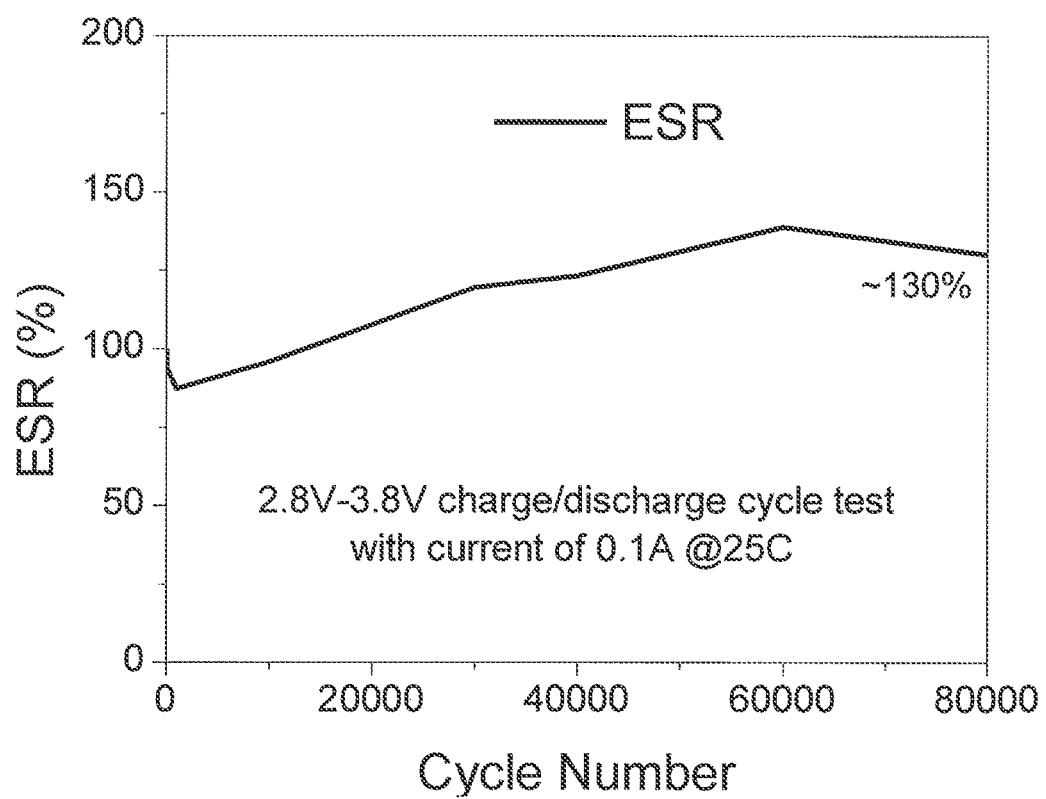
FIG. 3B shows equivalent series resistance cycling performance of an ultra-thin lithium-ion capacitor cell under a constant current of 0.1 A charge-discharge from 2.8V to 3.8V.
Figure 3C:
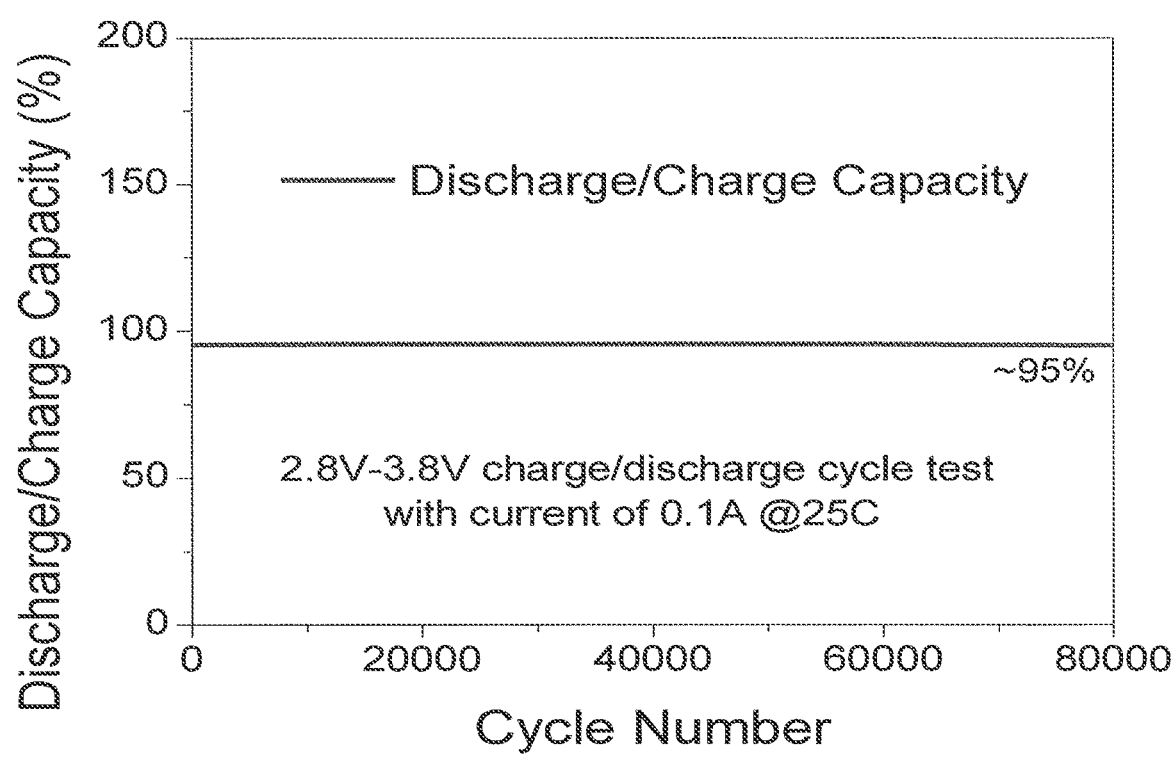
FIG. 3C shows discharge/charge capacity cycling performance of an ultra-thin lithium-ion capacitor cell under a constant current of 0.1 A charge-discharge from 2.8V to 3.8V.
Figure 3D:
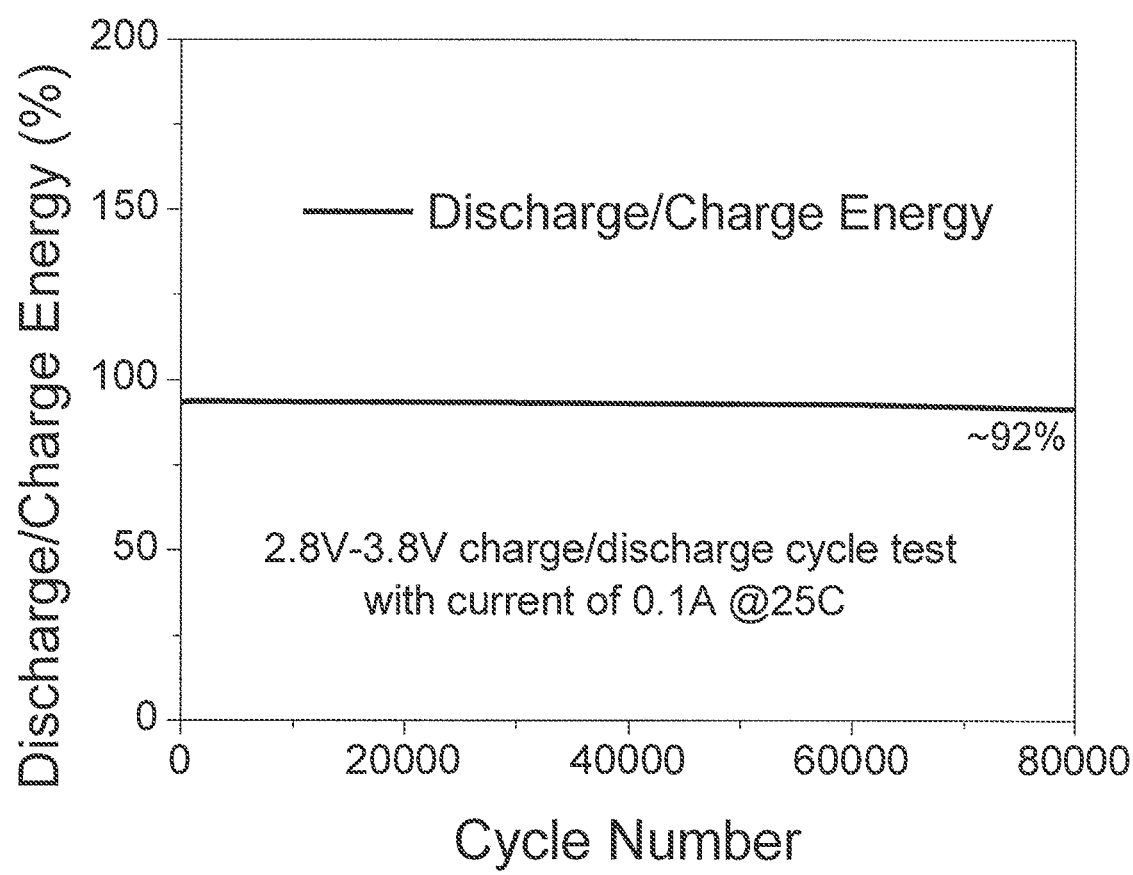
FIG. 3D shows discharge/charge energy percentage change cycling performance of an ultra-thin lithium-ion capacitor cell under a constant current of 0.1 A charge-discharge from 2.8V to 3.8V.
Figure 4A:
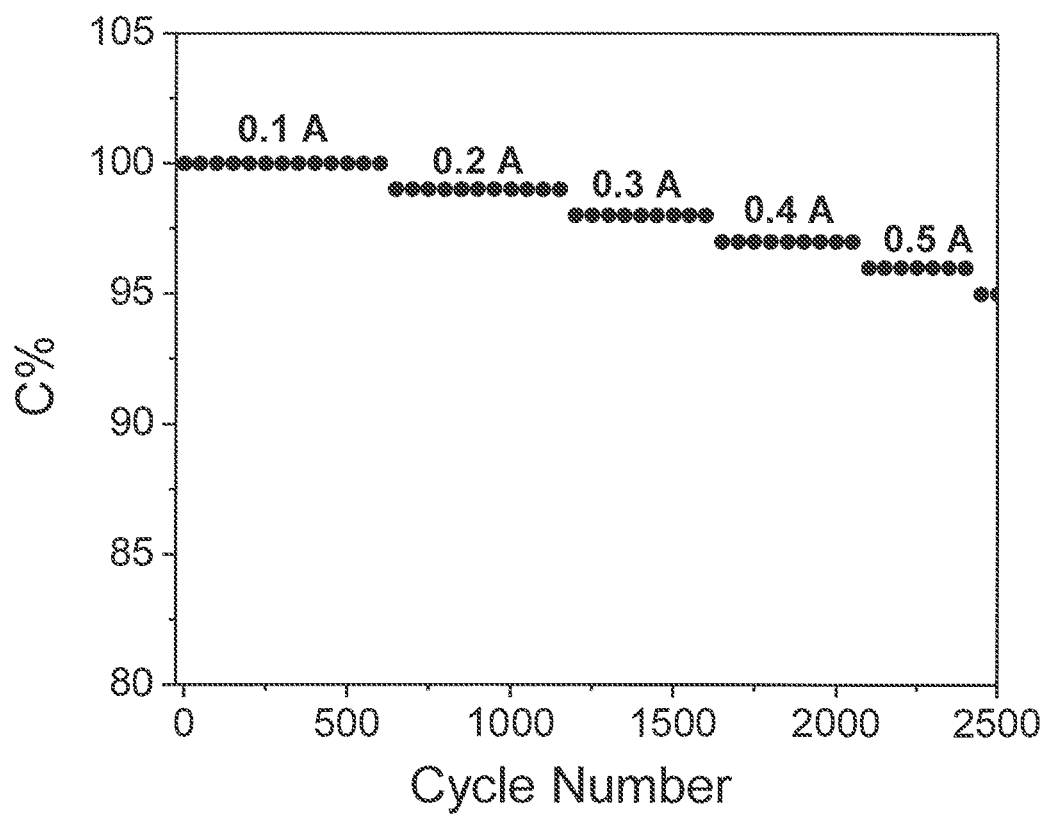
FIG. 4A shows capacitance change cycling performance of an ultra-thin lithium-ion capacitor cell under different current charge-discharge from 2.8V to 18V.
Figure 4B:
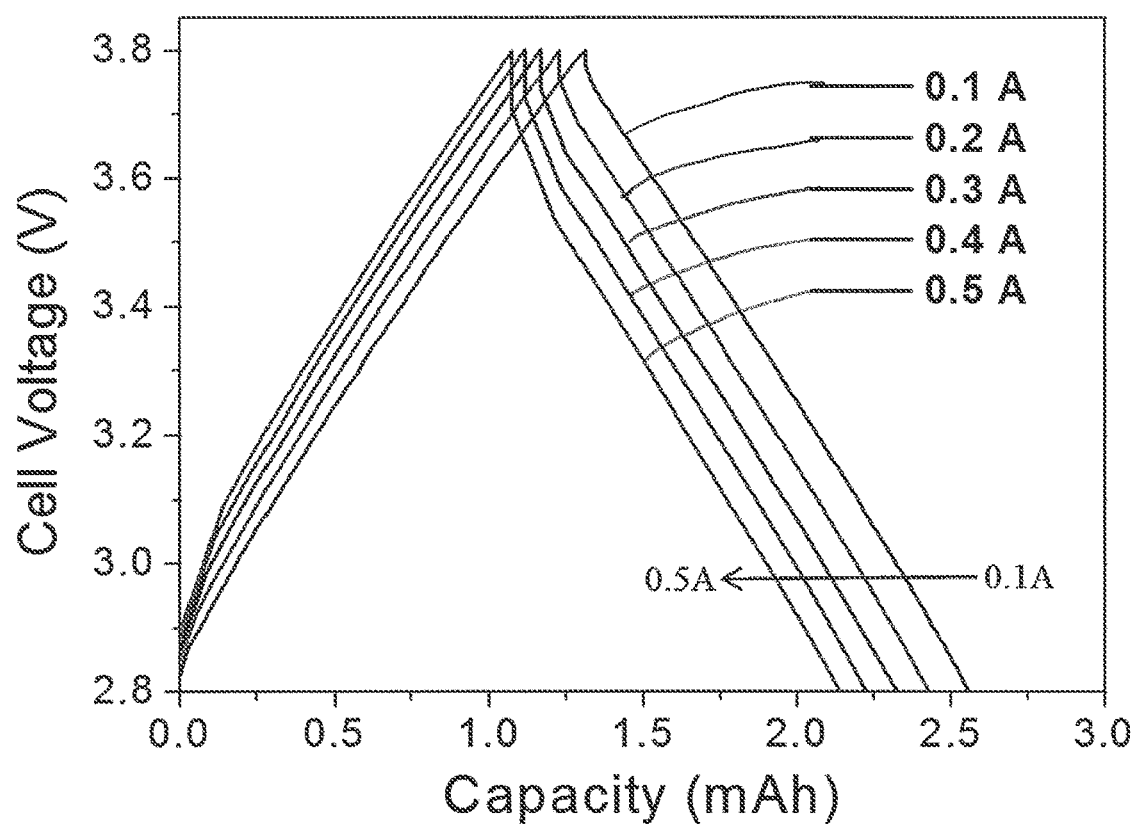
FIG. 4B shows charge/discharge profile cycling performance of an ultra-thin lithium-ion capacitor cell under different current.

FIG. 2A shows the EIS scan results of cell A1 and A2, and the inset portion thereof shows the lowest ESR as 0.041 ohm. Therefore, 0.041 ohm is the unavoidable resistance including the separator, electrolyte, electrodes, and all other contact resistance for these cells. For an easier comparison with cells described below, ESR data under different frequencies, particularly 0.1 Hz, were collected. FIG. 2B shows that the ultra-thin LIC had an ESR of 0.1066 ohm under 0.1 Hz, which is low enough for practical applications. To determine if a capacity ratio of 0.1-0.15 is an optimal range, multiple cells with various capacity ratios of PE/NE were fabricated and tested. Results are shown in FIG. 2C. It can be concluded that when the capacity ratio of PE/NE falls in the range of 0.08-0.2 (marked in a (yellow) rectangle within FIG. 2C), the cell can hold an ESR under 0.25 ohm, because electrode capacity is directly related to active layer mass and specific capacity. Based on the feasibility of manufacturing ultra-thin NE, the optimized PE/NE capacity ratio will limit the thickness of PE to an even smaller number. To explore the limitation of the material itself, AC was tested using SEM techniques to see if the particle size can satisfy this requirement. It can be observed from FIG. 2D that the activated carbon shows an average particle size of 5 μm, which is a porous structure. The PE's porosity is about 70%.

number forward to see the potential of the novel ultra-thin LIC. In this test the voltage range was still from 2.8 V to 3.8 V. The change in capacitance can be seen in FIG. 4A. With gradual increased charge and discharge current, the cell's capacitance was decreased step by step. Referring to FIG. 4A, even with a charge/discharge current of 0.5 A (250 C rate), the ultra-thin LIC still reserved 96% capacitance when compared with the 50 C rate. This property demonstrates the excellent ultra-high-power performance of the cell. Charge and discharge profiles of cells under different currents are displayed in FIG. 4B. For 0.1 A charge-discharge, the IR-drop was 0.02 V, while this number increased to about 0.1 V under 0.5 A cycling. Therefore, in practical applications, if the charge-discharge current increases from 0.1 A to 1 A, the IR-drop could be expected to increase from about 0.02 V to about 0.2 V.

Figure 4C:
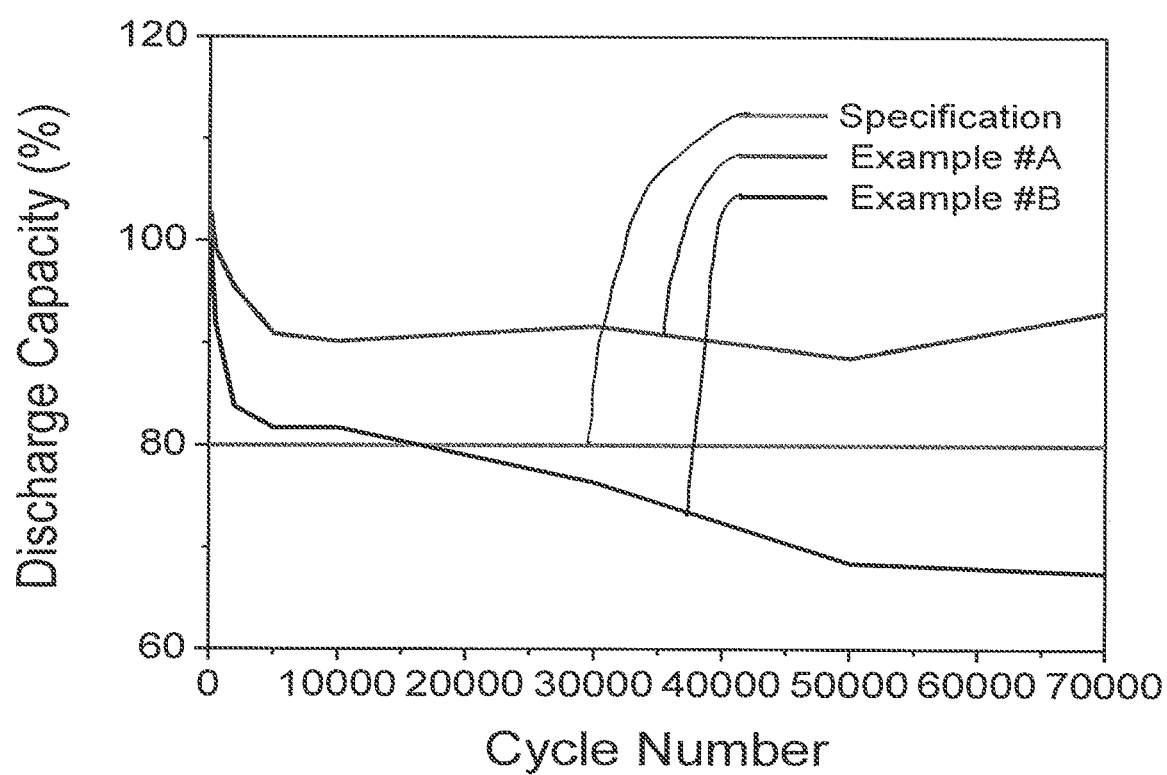
FIG. 4C shows comparison of discharge capacity changes according to cycle number.

Referring to FIG. 4C, samples from group A and B were charged and discharged under a 250 C rate (0.5 A) in the voltage range of 2.8 V-3.8 V. The samples from group A had an optimized PE/NE capacity ratio, while the sample from group B did not. From this comparison, it is easily noticed that cells with optimized PE/NE capacity ratio have extraordinary cycling performance and can maintain 93% of their initial discharge capacity even after 70,000 cycles. However, example B's discharge capacity fell under 80% after only 16,500 cycles. Thus, the capacity ratio of PE/NE not only has effects on ESR and power performance but also changes the ability of the cell to survive in a long cycling test. Unbalanced electrode content may cause obstacles for continuously charging and discharging, and cell performance can be sacrificed.

Figure 4D:
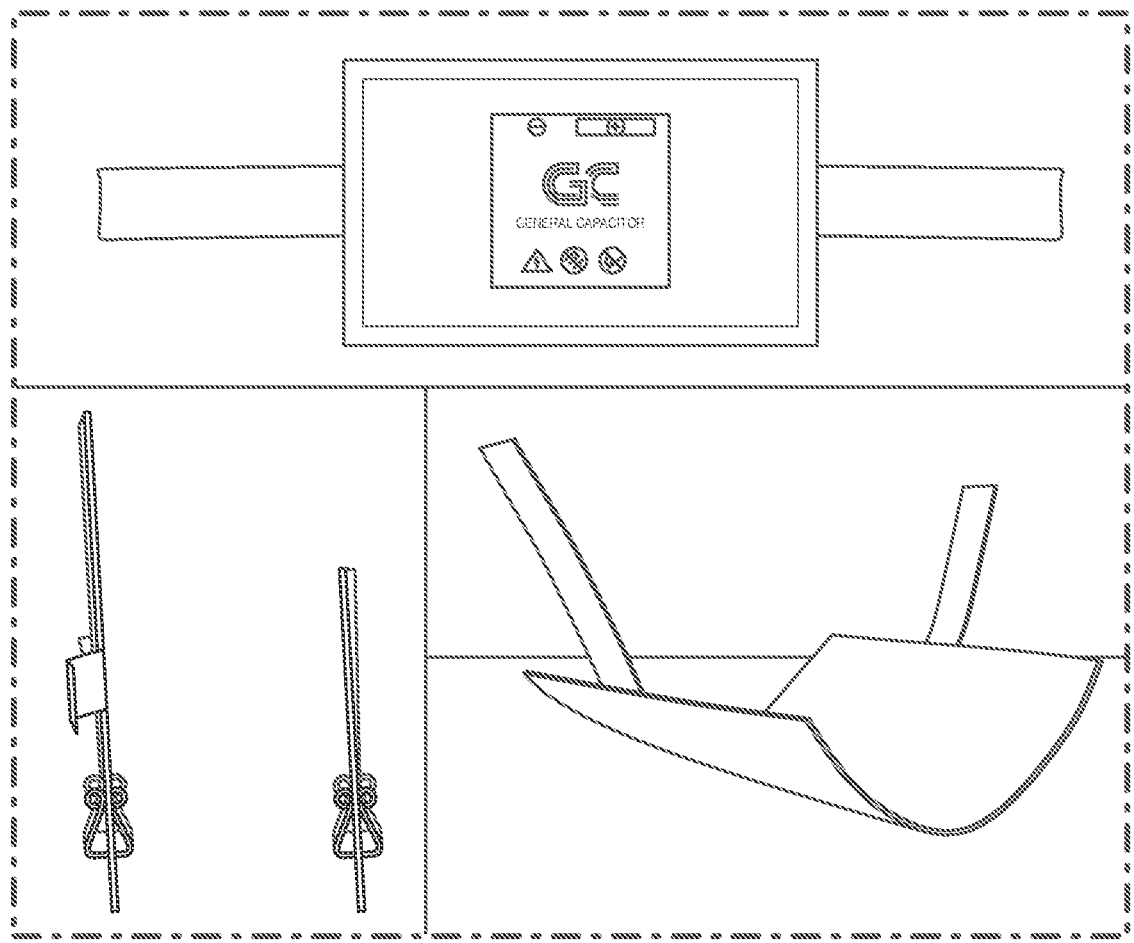
FIG. 4D shows photos of an ultra-thin lithium-ion capacitor cell according to an embodiment of the subject invention.

After the capacity ratio of PE/NE was optimized, the ultra-thin LIC with high power and good cycling performance is shown in FIG. 4D. The cell is displayed as a wing cell for a better current distribution. The thickness of this ultra-thin LIC was quantified in the figure by comparison with a 0.5 mm thick piece of rubber. FIG. 4D also demonstrates the flexibility of the ultra-thin LIC, showing that such a cell can be bent like paper, which is also advantageous for most practical applications.

As discussed above, the novel paper-thin LICs of embodiments of the subject invention can provide more options on special applications such as small signal transmitting and receiving. In certain cases, this type of application requires short-time discharge and response. Thus, a pulse test was performed. After final seal, the standard cell was charged to 3.8 V at a current of 10 mA. Then, the cell was discharged under 150 mA (high rate) for 1 second. This immediate discharge can provide power for sending a small signal. To test the paper-thin cell's response time, it was charged again with a constant current of 10 mA to the maximum working voltage 3.8 V.

Figure 5A:
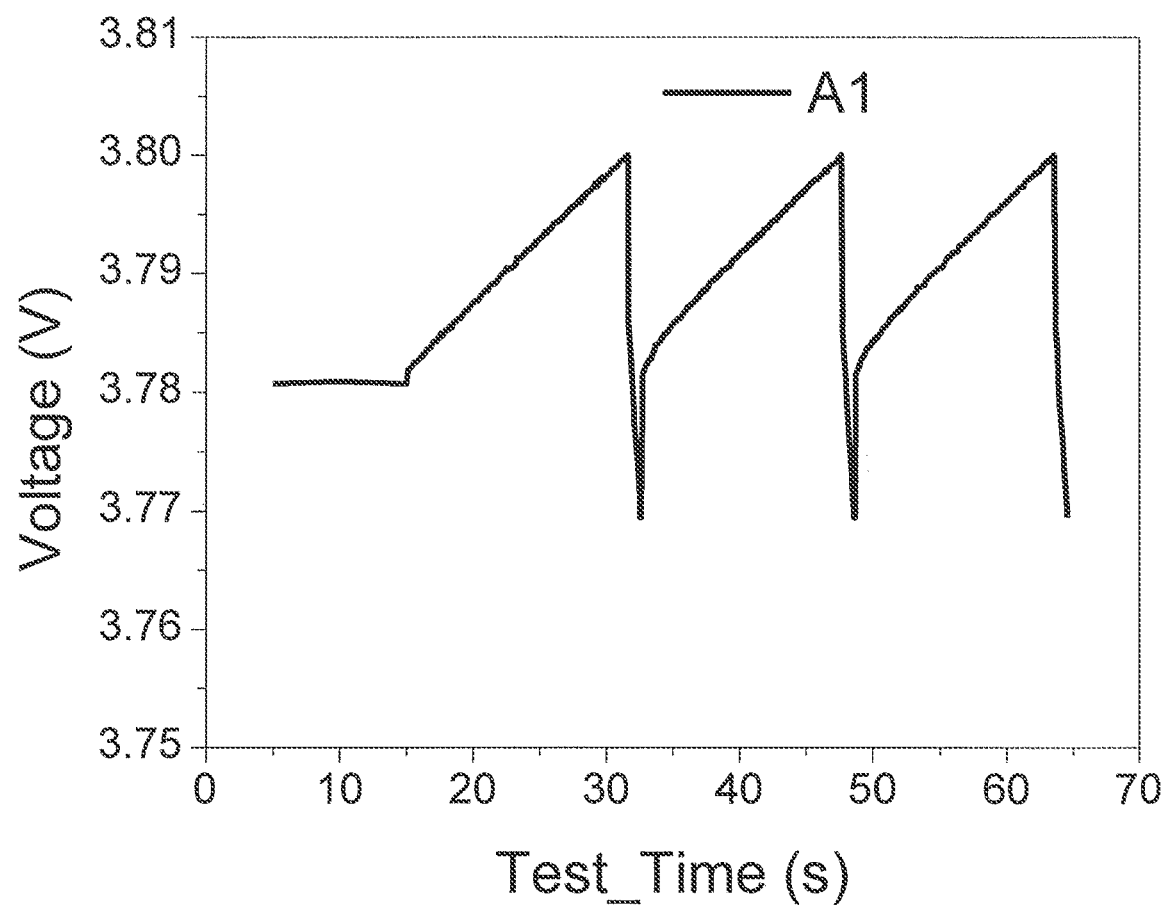
FIG. 5A shows charge/discharge profile of an ultra-thin lithium-ion capacitor cell under pulse charge and discharge tests.
Figure 5B:
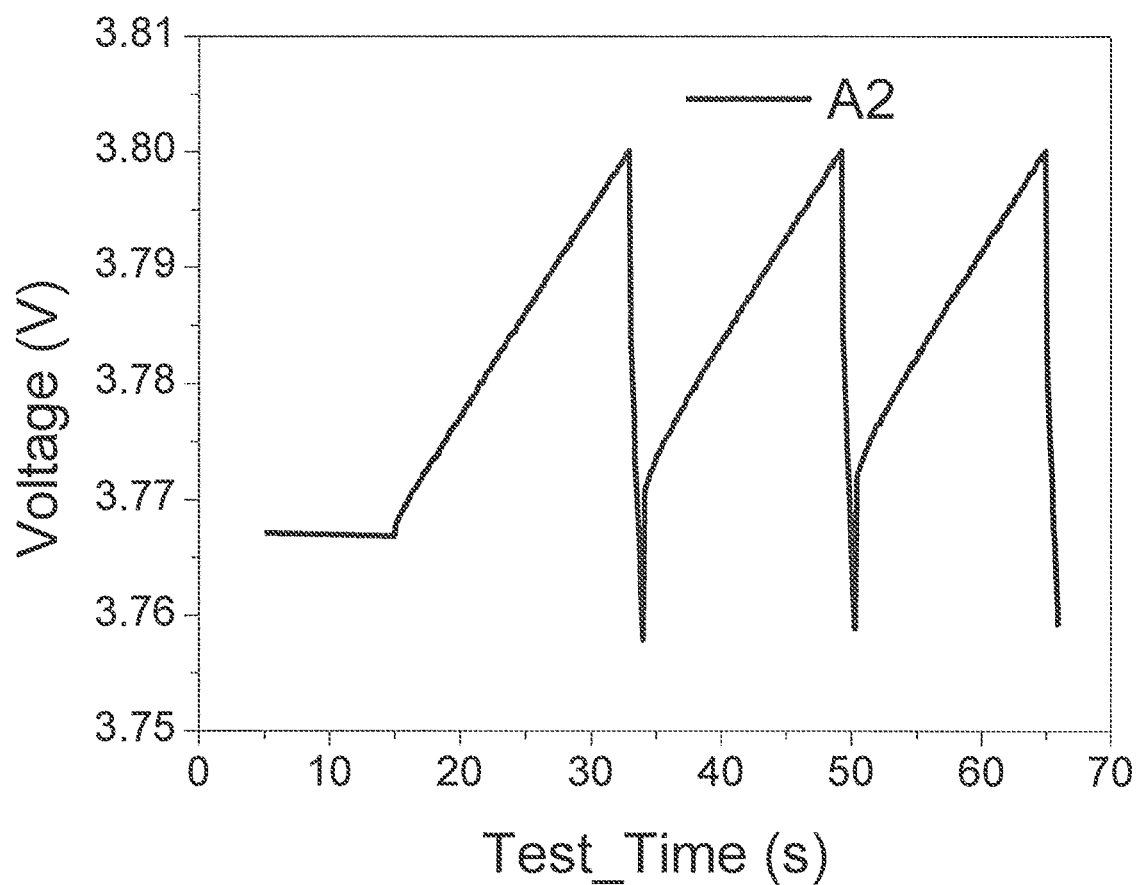
FIG. 5B shows charge/discharge profile of an ultra-thin lithium-ion capacitor cell under pulse charge and discharge tests.
Figure 5C:
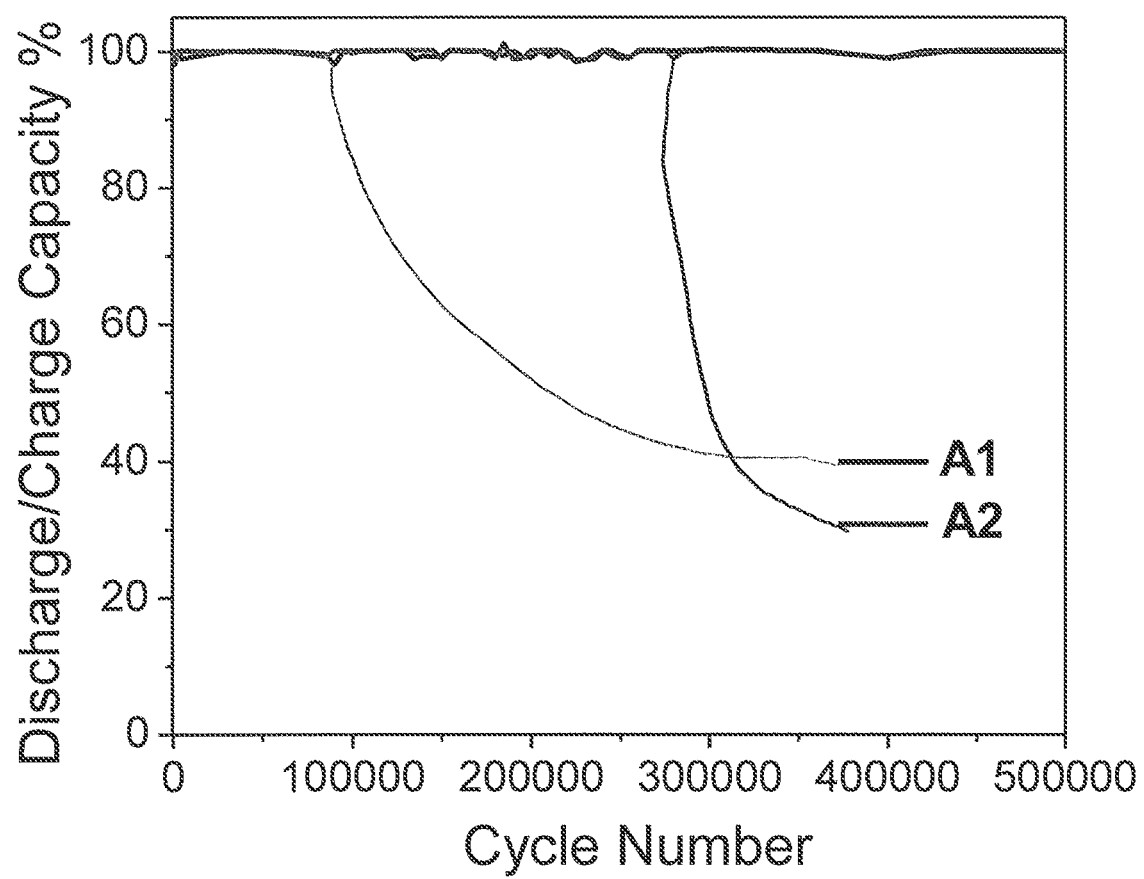
FIG. 5C shows discharge capacity percentage of an ultra-thin lithium-ion capacitor cell under pulse charge and discharge cycling performance.
Figure 5D:
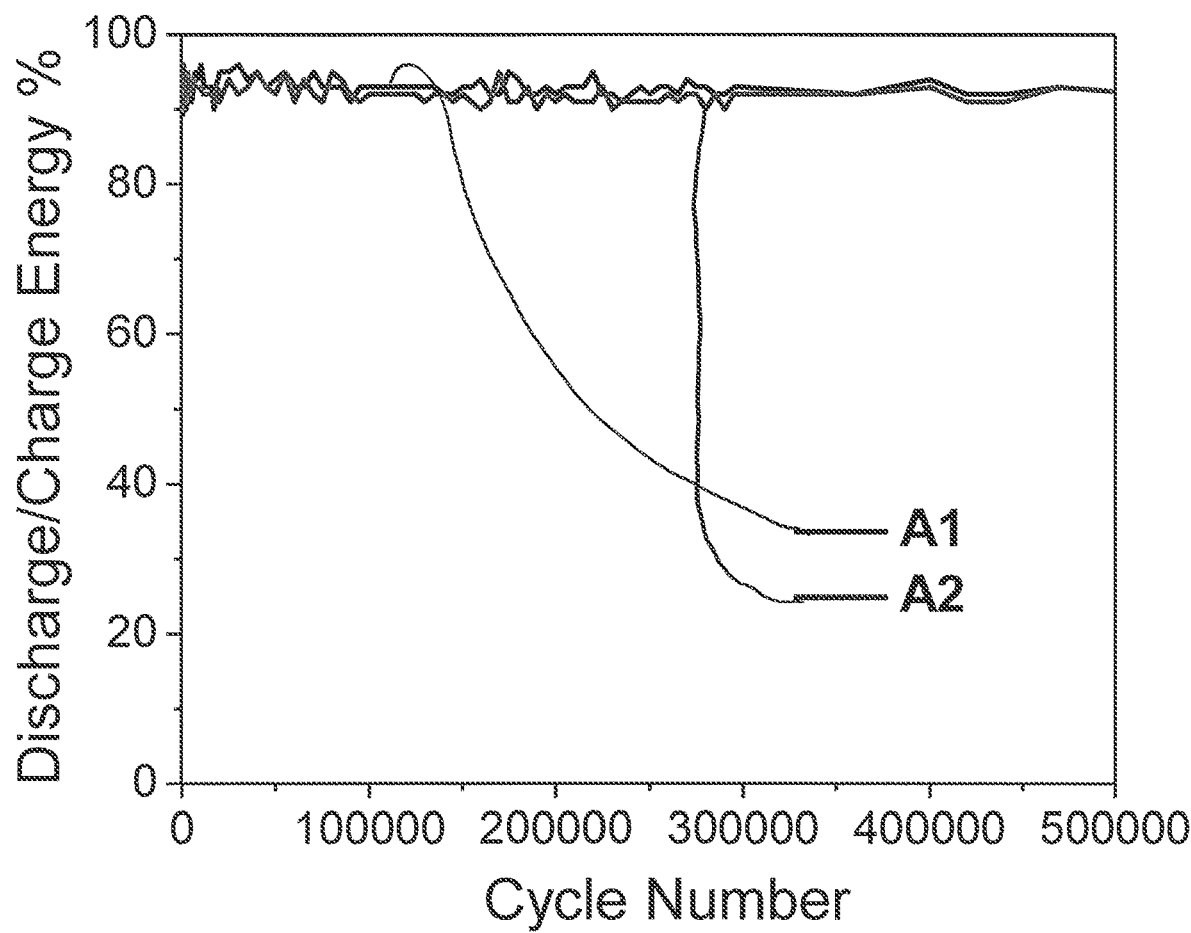
FIG. 5D shows discharge energy change of an ultra-thin lithium-ion capacitor cell under pulse charge and discharge cycling performance.

Response time of two standard cells was recorded, with results shown in FIG. 5A and 5B. Referring to FIGS. 5A and 5B, a 15 second to 16 second response time was verified, such that this cell can be ready to provide power to send the next signal after 15-16 seconds of charging. In this experiment, one 150 mA immediate discharge plus one 10 mA charge response time was regarded as one pulse cycle. FIGS. 5C and 5D show the results of long time pulse cycle life testing. Two cells from FIGS. 5A and 5B were cycled more than 500,000 times, and their discharge/charge capacity and energy percentages were stable. This demonstrates the pulsed cycling performance of the novel ultra-thin LIC.

Table 2 shows C&ESR test results for cells before and after a long time pulsed cycle life test. Due to the difference in cell capacitance, a testing current of 0.1 A results in a different testing rate for two cells. Thus, ESR at the same frequency was further tested for an effective comparison. Because both cells' C&ESR were tested at a high rate (0.1 A), ESR under 0.1 Hz was verified and recorded as a low rate result (Table 2). After 500,000 cycles of discharge and charge, both cells maintained their capacitance, and their changes were only 1% and 2%, respectively. ESR at a high rate results in a difference in how a long time pulsed cycle can change the results. However, under a 0.1 Hz frequency EIS test, both cells maintained a quarter increase (27% and 24%, respectively) after 500,000 pulsed cycles (Table 2). ESR at 0.1 Hz can be less than 0.15 ohm even after 6-month pulse tests. That is to say, this ultra-thin LIC can realize more than 500,000 small signal sending and receiving cycles in practical applications.

To investigate the electrochemical stability of the novel ultra-thin LIC under extreme conditions, DC life testing was conducted on the cell. The initial capacitance and ESR were tested first and used as the 0 hour DC life's C&ESR results. Then, the tested cell was held under the maximum constant operating voltage of 3.8 V by a standard power supply and kept in a 65° C. oven for 2000 hours in total. In the 2000 test hours, the cell was taken out of the oven after certain hours to cool down to room temperature. After cooling down, the cell was then retested to determine its C&ESR, and DC life test results were recorded after the cell being kept for 100 hours, 200 hours, 300 hours, 500 hours, 750 hours, 1000 hours, 1500 hours, and 2000 hours in the oven.

TABLE 2

C&ESR results comparison of cells before and after long time pulsed cycle life test

| Before & After long time pulsed cycle life test | | Under 0.1 A charge/discharge | | Under f = 0.1 Hz |
|---|---|---|---|---|
| | | C (F) | ESR (ohm) | ESR (ohm) |
| A1 | Before | 8.78 | 0.065 | 0.0856 |
| | After | 8.71 | 0.118 | 0.109 |
| | After/Before | 99% | 182% | 127% |
| A2 | Before | 5.37 | 0.083 | 0.107 |
| | After | 5.27 | 0.074 | 0.133 |
| | After/Before | 98% | 89% | 124% |

Figure 6A:
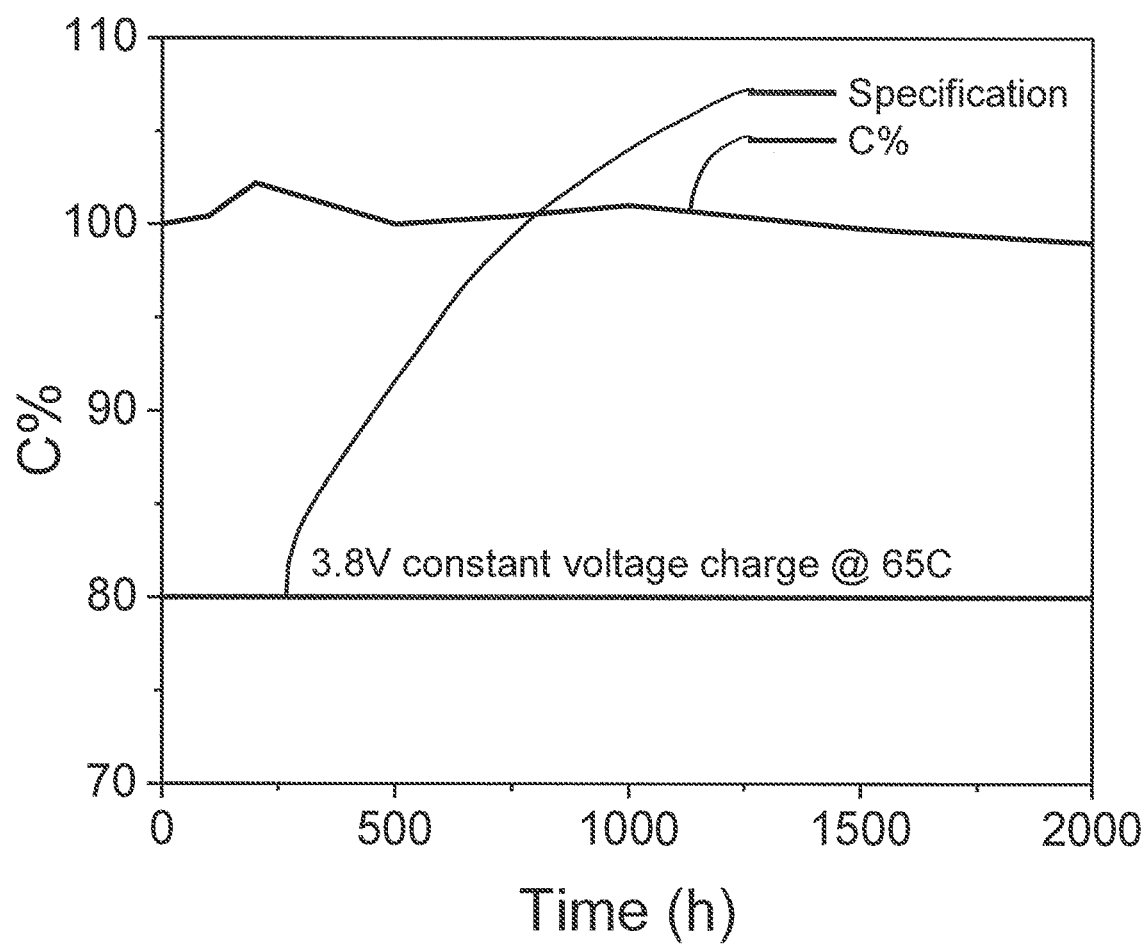
FIG. 6A shows capacitance DC life performance of an ultra-thin lithium-ion capacitor cell at maximum voltage 3.8V under 65° C.
Figure 6B:
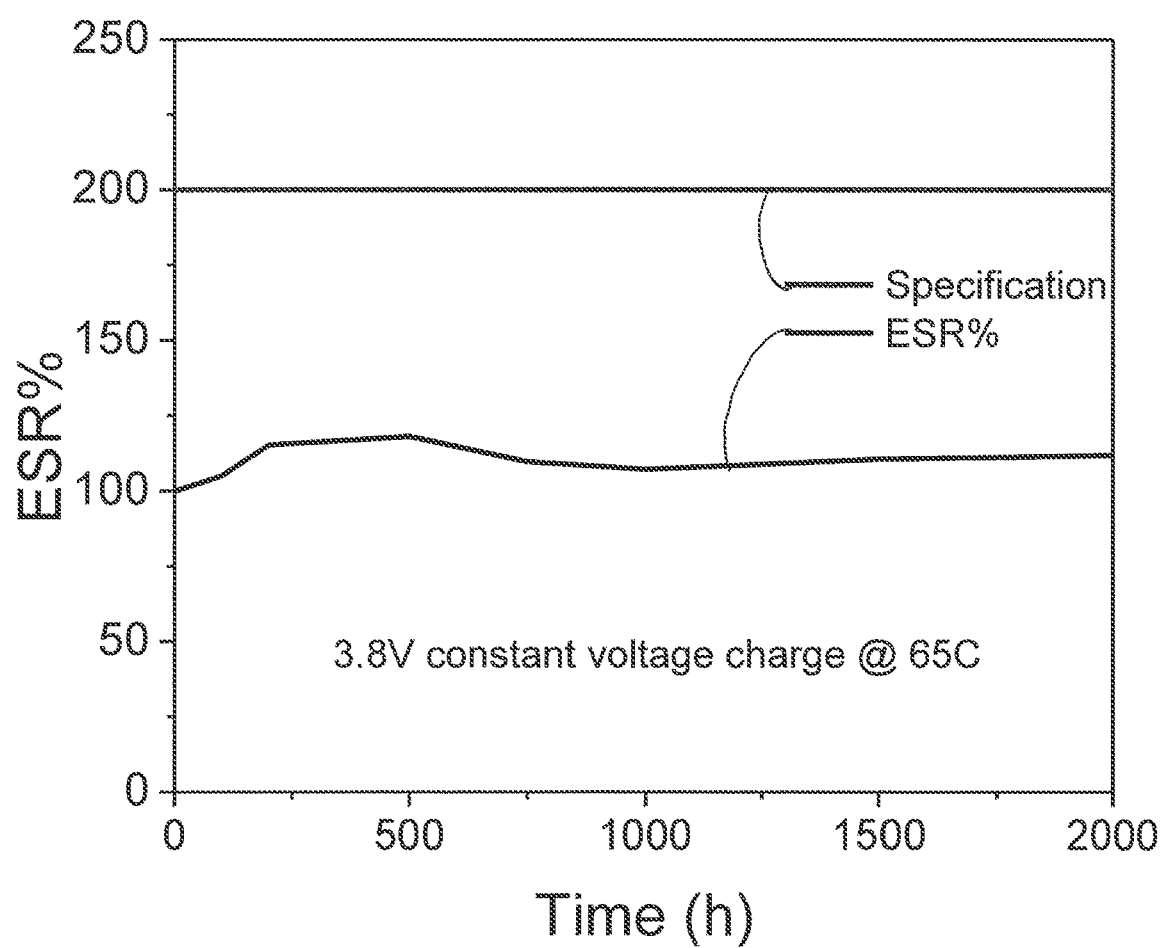
FIG. 6B shows equivalent series resistance DC life performance of an ultra-thin lithium-ion capacitor cell at maximum voltage 3.8V under 65° C.

FIG. 6 shows the C&ESR percentage changes during the DC life test. After 2000 hours of constant 3.8 V charge, the capacitance of the cell remained at 98% of the value for the initial test, and the ESR had only a 12% increase under this extreme environment. DC life results demonstrate that the ultra-thin LIC has stable electrochemical performance when it is held under 3.8 V in an environment of 65° C.

EXAMPLE 2

Figure 7:
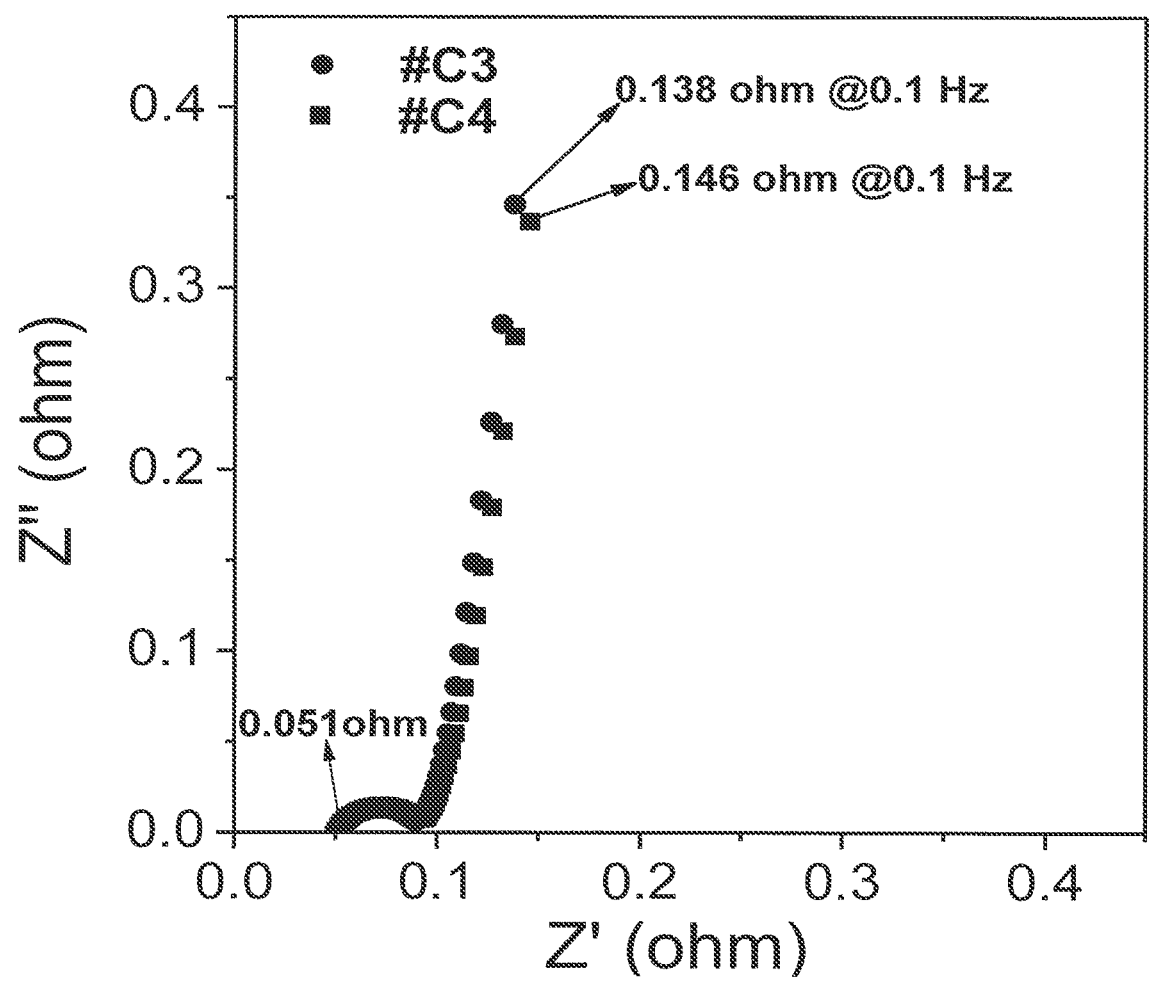
FIG. 7 shows electrochemical impedance spectrum figure of an ultra-thin lithium-ion capacitor cell with low temperature electrolyte.

To achieve a lower temperature range down to −40° C., a low temperature (LT) electrolyte was utilized in the ultra-thin LICs of embodiments of the subject invention. Cell information and test results are shown in Table 3. The ESR value in group C is larger than that of group A and less than that of group B. To achieve operation at −40° C., power performance of the LIC was sacrificed some at room temperature. However, the ESR of group C was still maintained within 0.2 ohm with an optimized PE/NE capacity ratio. For a cell filled with an LT electrolyte, 0.051 ohm was the unavoidable resistance including the separator, LT electrolyte, electrodes, and all other contact resistance (FIG. 7). Compared with group A, the resistance at 0.1 Hz was 29.5%-37.0% larger for group C (0.138 ohm and 0.146 ohm). The cell also delivered high specific energy (56 Wh/kg) and ultra-high maximum specific power (up to 128 kW/kg) based on the electrode active layers' weight.

TABLE 3

| | Cell assembly details and initial C&ESR test results of group C | | | | | | | | |
|---|---|---|---|---|---|---|---|---|---|
| Example | PE Thickness (μm) | NE Thickness (μm) | Capacity Ratio of PE/NE | C (F) | ESR (Ohm) | Specific Energy (Wh/kg) | Energy Density (Wh/L) | Max. Specific Power (kW/kg) | Max. Power Density (kW/L) |
| C1 | 36 | 44 | 0.14 | 7.4 | 0.193 | 56 | 17 | 105 | 31 |
| C2 | 35 | 48 | 0.12 | 6.8 | 0.174 | 54 | 15 | 124 | 34 |
| C3 | 33 | 48 | 0.12 | 6.7 | 0.167 | 53 | 15 | 128 | 36 |
| C4 | 35 | 48 | 0.12 | 7.3 | 0.164 | 56 | 16 | 126 | 36 |

In order to work in a wide variety of applications, an ultra-thin LIC needs to be functional within a large range of working temperatures (e.g., from −40° C. to 70° C.). Cells with standard organic electrolytes were made to be tested at various working temperatures, while cells with LT organic electrolytes were also tested in the same environment. A comparison is shown in FIGS. 8A-8D, in which a cell at 30° C. was set as 100% standard performance and cell performance at other temperatures were compared with such a cell.

Figure 8A:
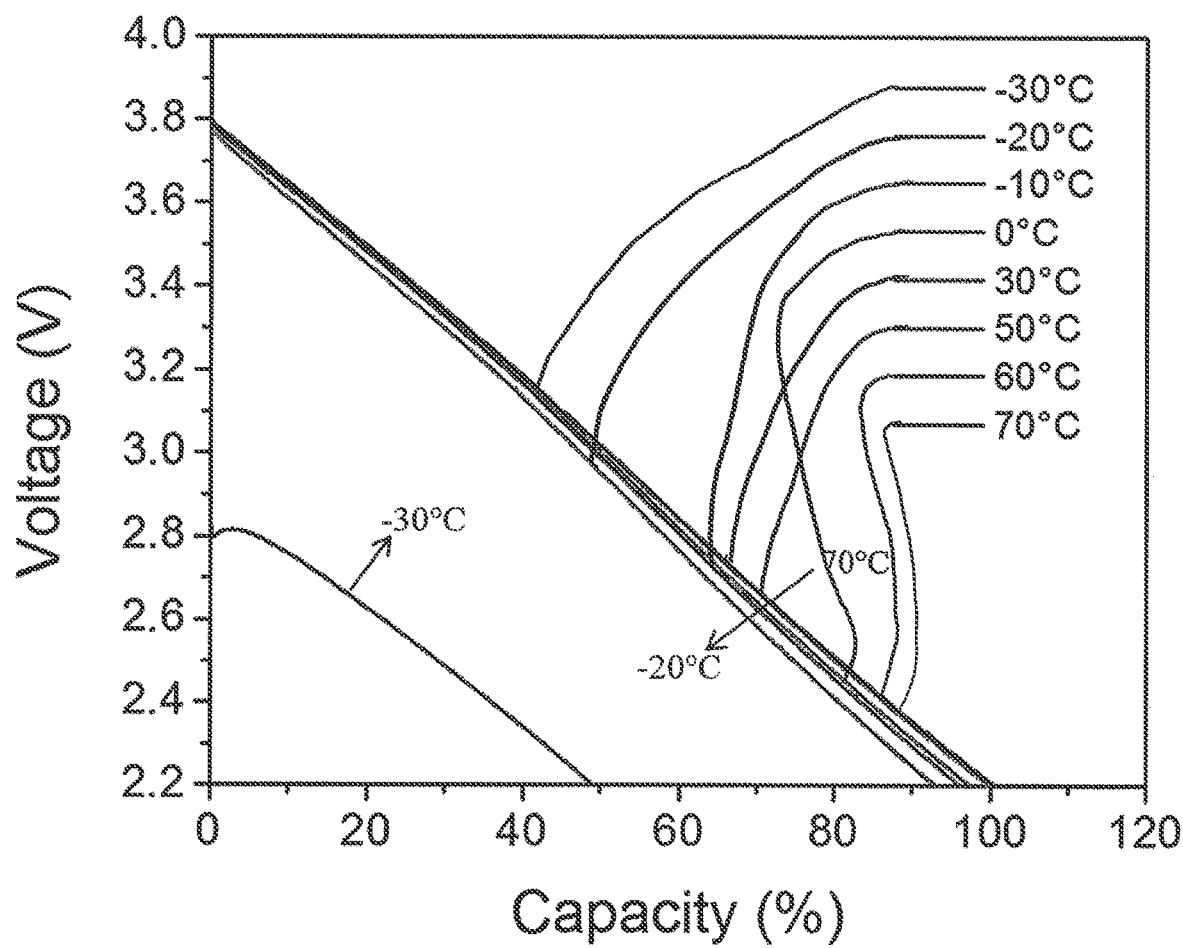
FIG. 8A shows discharge profiles of an ultra-thin lithium-ion capacitor cell with standard organic electrolyte under different temperature environment from 3.8-2.2V with a constant current.
Figure 8B:
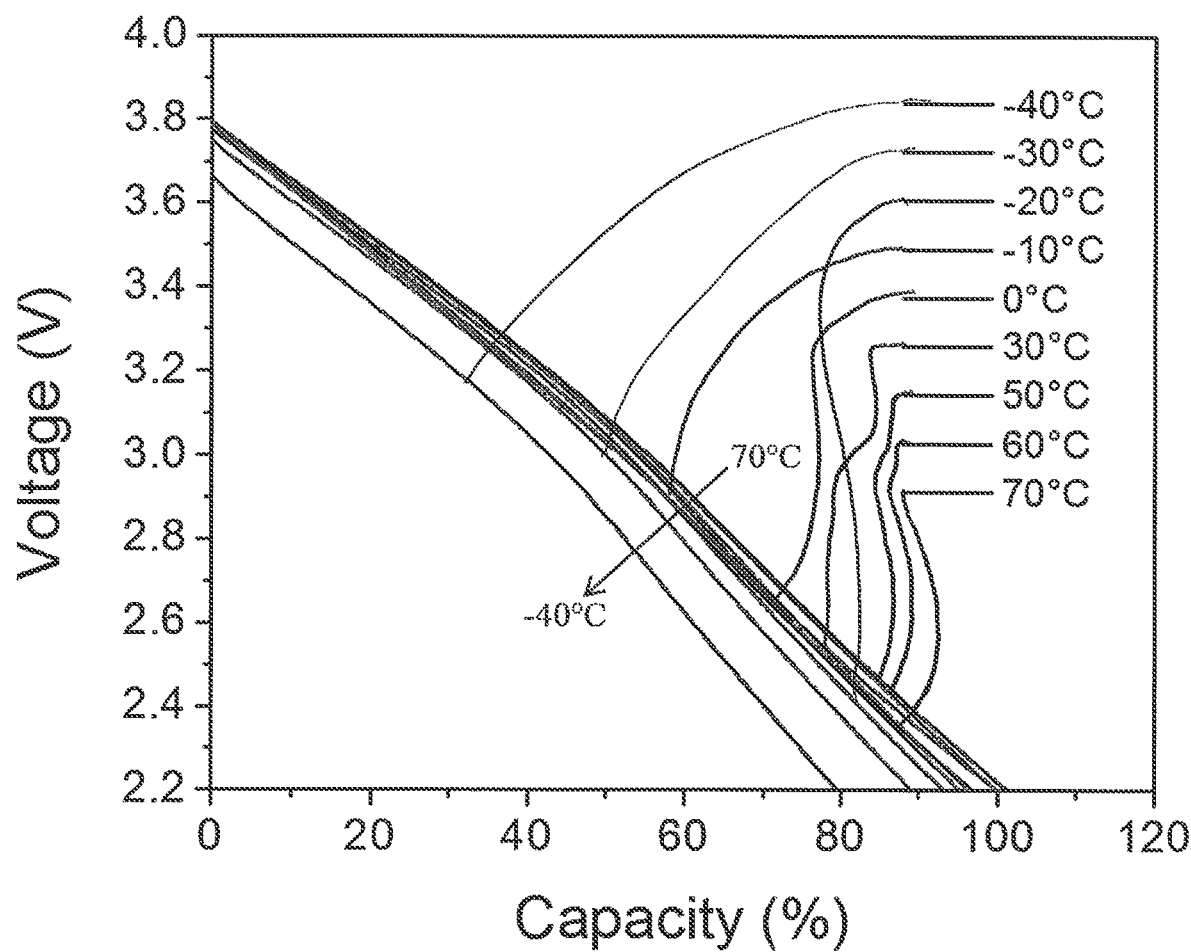
FIG. 8B shows discharge profiles of an ultra-thin lithium-ion capacitor cell with low temperature organic electrolyte under different temperature environment from 3.8-2.2V with a constant current.

FIGS. 8A and 8B show results for cells with different functional electrolytes. Under −30° C., the cell with the standard organic electrolyte can only reach a very low capacity percentage (48%, compared with the 30° C. cell performance), which is even worse than the cell with the LT electrolyte working in a −40° C. environment (capacity: 80%, compared with 30° C. cell performance). With the standard organic electrolyte, the cell had no performance in −40° C.

Figure 8C:
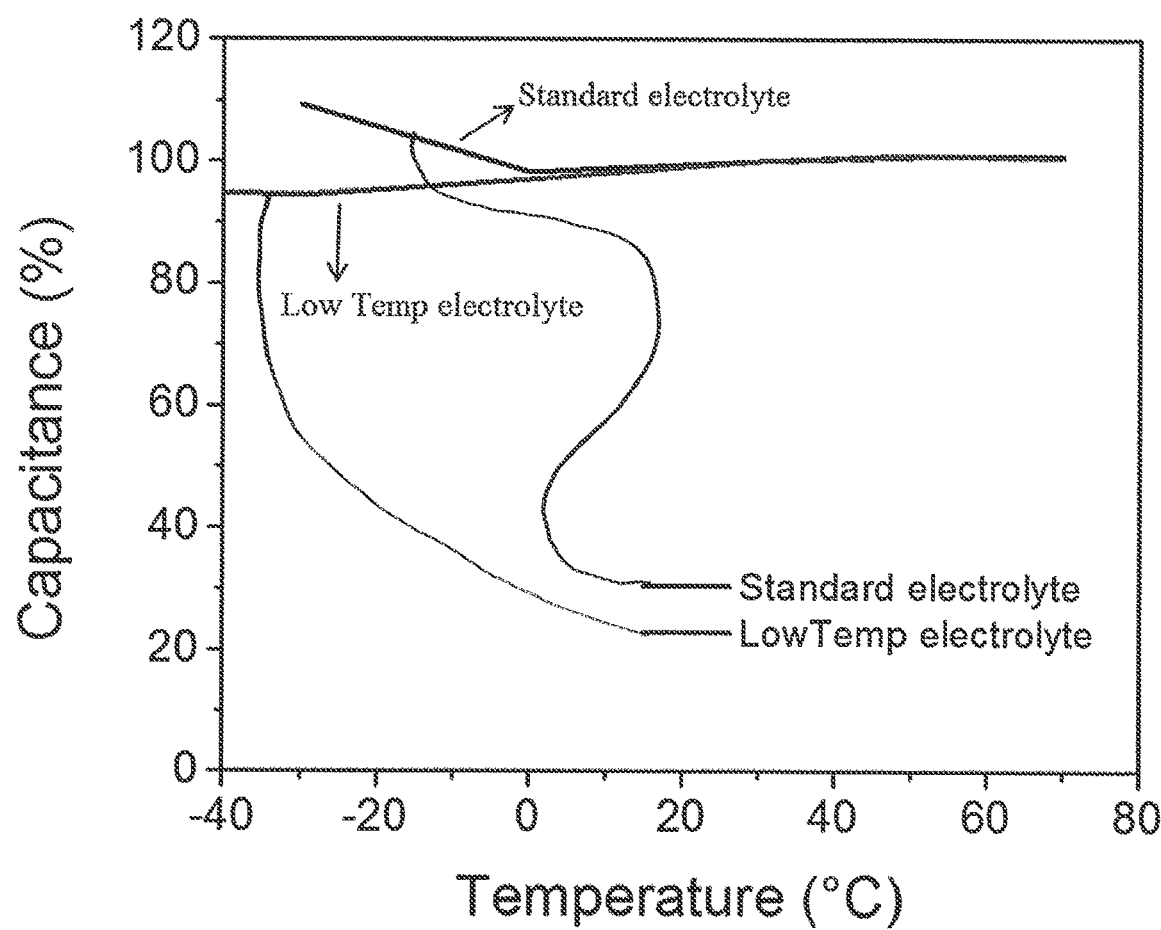
FIG. 8C shows capacitance performance of an ultra-thin lithium-ion capacitor cell according to temperature.
Figure 8D:
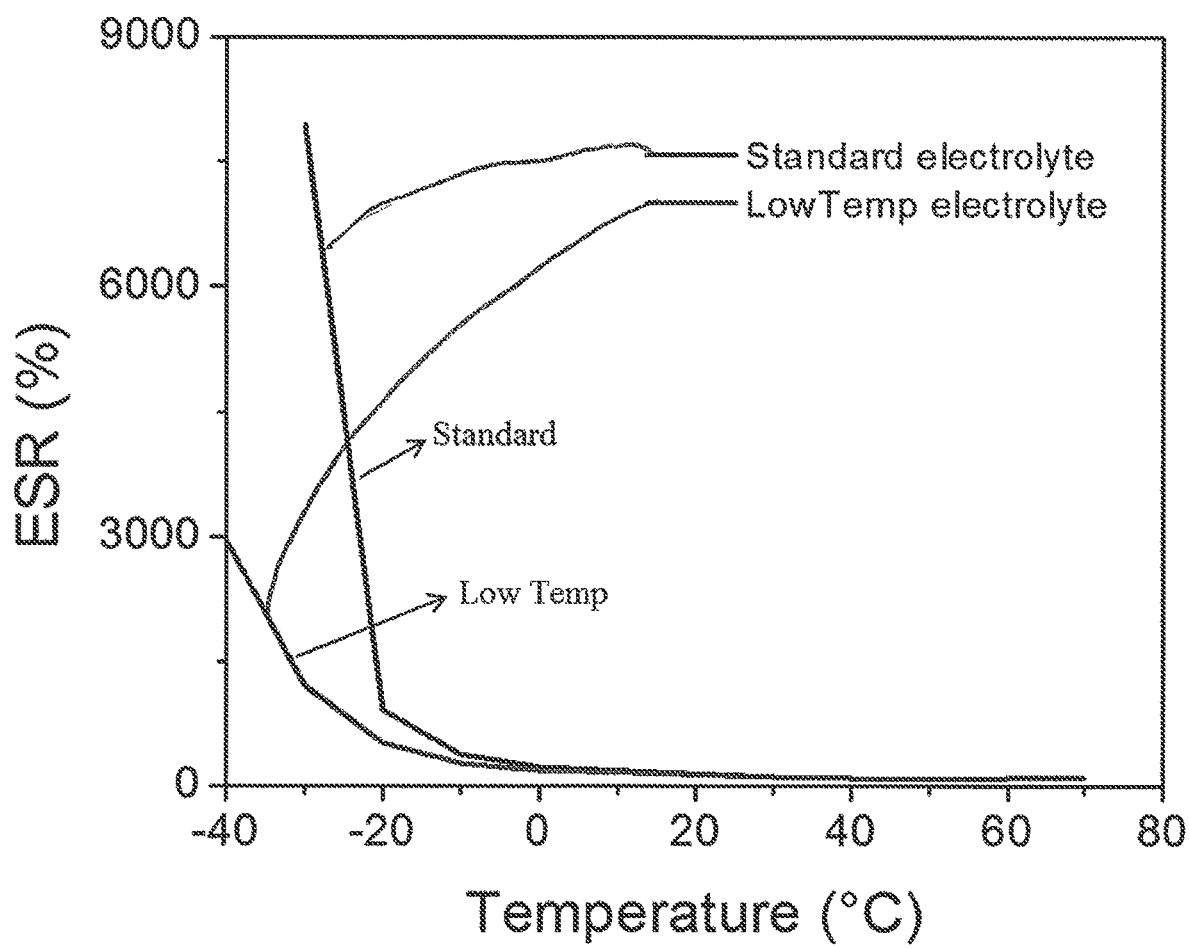
FIG. 8D shows equivalent series resistance performance of an ultra-thin lithium-ion capacitor cell according to temperature.

FIGS. 8C and 8D show the capacitance and ESR change for cells at different working temperatures. Referring to FIGS. 8C and 8D, there is no obvious difference between the performance of the two electrolytes when the temperature is above 0° C. However, the standard cell has a 7949% increase in ESR under −30° C., while the LT cell has only a 2967% increase in ESR even under −40° C. This number for the LT cell decreases to 1196% when under −30° C. From this test, it can be seen that standard cells can work well under −20° C., and cells with special LT organic electrolytes can work well even under −40° C.

EXAMPLES

1. An ultra-thin lithium ion capacitor, comprising:
(a) a first ultra-thin single-side positive electrode layer having a thickness of no more than 50 μm;
(b) a second ultra-thin single-side positive electrode layer having a thickness of no more than 50 μm;
(c) an ultra-thin double-side negative electrode layer having a thickness of no more than 50 μm;
(d) a first ultra-thin lithium film source layer and a second ultra-thin lithium film source layer respectively uniformly pre-loaded on both surfaces of the negative electrode by optimized pressure;
(e) a plurality of separators; and
(f) an organic solvent electrolyte comprising a lithium salt,
wherein a total thickness of the ultra-thin lithium ion capacitor is no more than 1.0 millimeter.

2. The ultra-thin lithium ion capacitor according to example 1, wherein each of the first positive electrode and the second positive electrode comprises a positive electrode active material, wherein the positive electrode active material comprises activated carbon.

3. The ultra-thin lithium ion capacitor according to example 2, wherein the activated carbon has a surface area in a range of from 1000 m$^2$/g to 3000 m$^2$/g and a particle size $D_{50}$ of no more than 5 μm.

4. The ultra-thin lithium ion capacitor according to any of examples 2-3, wherein the positive electrode active material further comprises carbon black (CB) mixed with the activated carbon (AC), and wherein the mass ratio of AC:CB is in a range of from 90:10 to 99:1.

5. The ultra-thin lithium ion capacitor according to any of examples 1-4, wherein each of the first positive electrode and the second positive electrode comprises styrene butadiene rubber (SBR) and carboxymethyl cellulose (CMC) as binders, and wherein the mass ratio of SBR:CMC within each of the first positive electrode and the second positive electrode is in a range of from 3:1 to 1:3.

6. The ultra-thin lithium ion capacitor according to example 4, wherein each of the first positive electrode and the second positive electrode comprises styrene butadiene rubber (SBR) and carboxymethyl cellulose (CMC) as binders, and wherein a mass ratio of SBR:CMC within each of the first positive electrode and the second positive electrode is in a range of from 3:1 to 1:3, and wherein the ratio of total mass of AC and CB to the total mass of SBR and CMC is in a range of from 85:15 to 98:2.

7. The ultra-thin lithium ion capacitor according to any of examples 1-6, wherein the negative electrode comprises a negative electrode active material, and wherein the negative electrode active material comprises hard carbon, soft carbon, and graphite.

8. The ultra-thin lithium ion capacitor according to example 7, wherein the negative electrode active material has a particle side $D_{50}$ of no more than 10 μm.

9. The ultra-thin lithium ion capacitor according to any of examples 7-8, wherein the negative electrode comprises styrene butadiene rubber (SBR) and carboxymethyl cellulose (CMC) as binders, and wherein the mass ratio of SBR:CMC within each of the first positive electrode and the second positive electrode is in a range of from 3:1 to 1:3, and wherein the ratio of the total mass of the negative electrode active material to the total mass of SBR and CMC is in a range of from 90:10 to 98:2.

10. The ultra-thin lithium ion capacitor according to any of examples 1-9, wherein the ratio of a total thickness of active layers of the first and second positive electrodes to a total thickness of active layers of the negative electrode is in a range of from 1:2 to 3:1.

11. The ultra-thin lithium ion capacitor according to any of examples 1-10, wherein the ratio of the capacity of active layers of the first and second positive electrodes to active layers of the negative electrode is in a range of from 0.08 to 0.2.

12. The ultra-thin lithium ion capacitor according to any of examples 1-11, wherein the separators comprise at least one of cellulose, polypropylene (PP), and polyethylene (PE) based material.

13. The ultra-thin lithium ion capacitor according to any of examples 1-12, wherein a thickness of the each of the first ultra-thin lithium source layer and the second ultra-thin lithium source layer is in a range of from 2 μm to 20 μm.

14. The ultra-thin lithium ion capacitor according to any of examples 1-13, wherein an area of each of the first ultra-thin lithium source layer and the second ultra-thin lithium source layer is about 25% to about 100% of the area of the side of the negative electrode on which it is disposed.

The ultra-thin lithium ion capacitor according to example 1, wherein the mass ratio percentage of the first ultra-thin lithium source layer to the side of the negative electrode on which it is disposed is in a range of from 7% to 14%, and wherein the mass ratio percentage of the second ultra-thin lithium source layer to the side of the negative electrode on which it is disposed is in a range of from 7% to 14%.

16. The ultra-thin lithium ion capacitor according to any of examples 1-15, wherein the organic solvent electrolyte comprises 1 M LiPF6 in ethylene carbonate (EC):ethyl methyl carbonate (EMC):methyl butyrate (MB) (20:20:60 by volume)+0.1 M lithium difluoro(oxalate)borate (LiDFOB).

17. The ultra-thin lithium ion capacitor according to any of examples 1-16, wherein the organic solvent electrolyte is capable of operating at a temperature of −40° C.

18. The ultra-thin lithium ion capacitor according to any of examples 1-17, wherein the internal resistance (ESR) of the ultra-thin lithium ion capacitor is no more than 0.25 ohm.

19. The ultra-thin lithium ion capacitor according to any of examples 1-18, wherein the maximum specific power of the ultra-thin lithium ion capacitor is in a range of from 274 kW/kg to 343 kW/kg calculated based on the weight of active layers of the first positive electrode, the second positive electrode, and the negative electrode.

20. A lithium ion capacitor, comprising:
a first positive electrode and a second positive electrode;
a negative electrode disposed between the first positive electrode and the second positive electrode;
a first lithium film disposed between the first positive electrode and the negative electrode; and
a second lithium film disposed between the second positive electrode and the negative electrode,
wherein each of the first lithium film and the second lithium film comprises an electrolyte.

21. The lithium ion capacitor according to example 20, wherein the negative electrode comprises a copper layer, a first carbon layer between the first lithium film and the copper layer, and a second carbon layer between the second lithium film and the copper layer.

22. The lithium ion capacitor according to any of examples 21-22, further comprising a first separator between the first positive electrode and the first lithium film, and a second separator between the second positive electrode and the second lithium film.

23. The lithium ion capacitor according to any of examples 21-23, wherein each of the first positive electrode and the second positive electrode comprises an aluminum layer and an activated carbon layer.

24. The lithium ion capacitor according to example 23, wherein the activated carbon layer comprises activated carbon, carbon black, carboxymethyl cellulose, and styrene-butadiene rubber.

The lithium ion capacitor according to example 24, wherein the mass ratio of the activated carbon (AC), the carbon black (CB), the carboxymethyl cellulose (CMC), and the styrene-butadiene rubber (SBR) of the activated carbon layer is 91:5:3:1 (AC:CB:CMC:SBR).

26. The lithium ion capacitor according to any of examples 21-25, wherein each of the first carbon layer and the second carbon layer comprises a hard carbon, styrene-butadiene rubber, and carboxymethyl cellulose.

27. The lithium ion capacitor according to example 26, wherein the mass ratio of the hard carbon (HC), the styrene-butadiene rubber (SBR), and the carboxymethyl cellulose (CMC) is 96:3:1 (HC:SBR:CMC).

28. The lithium ion capacitor according to any of examples 20-27, wherein the electrolyte comprises lithium hexafluorophosphate (LiPF$_6$) in ethylene carbonate and dimethyl carbonate.

29. The lithium ion capacitor according to any of examples 20-27, wherein the electrolyte comprises lithium hexafluorophosphate (LiPF$_6$) in ethylene carbonate, ethyl methyl carbonate, methyl butyrate, and lithium difluoro(oxalate)borate (LiDFOB).

30. The lithium ion capacitor according to any of examples 20-29, wherein each of the first carbon layer and the second carbon layer has at least 50% porosity.

31. The lithium ion capacitor according to any of examples 23-30, wherein the activated carbon layer has at least 70% porosity.

32. The lithium ion capacitor according to any of examples 20-31, wherein each of the first positive electrode and the second positive electrode has a thickness smaller than that of the negative electrode.

33. The lithium ion capacitor according to any of examples 20-32, wherein each of the first positive electrode, the second positive electrode, and the negative electrode comprises a tab.

34. The lithium ion capacitor according to any of examples 20-33, wherein a thickness of each of the first positive electrode, the second positive electrode, and the negative electrode is no more than 50 μm.

35. The lithium ion capacitor according to any of examples 20-34, wherein a total thickness of the lithium ion capacitor is no more than 1.0 millimeter.

36. A method for manufacturing a lithium ion capacitor, the method comprising:
preparing a first positive electrode and a second positive electrode;
preparing a negative electrode having a first surface facing the first positive electrode and a second surface facing the second positive electrode;
forming a first lithium film on the first surface of the negative electrode;
forming a second lithium film on the second surface of the negative electrode;
forming a sandwich cell by disposing the first positive electrode on the first lithium film and the second positive electrode on the second lithium film; and
soaking the sandwich cell with an electrolyte.

37. The method according to example 36, further comprising:
forming a first separator between the first positive electrode and the first lithium film; and
forming a second separator between the second positive electrode and the second lithium film.

38. The method according to any of examples 36-37, wherein soaking the sandwich cell comprises placing the sandwich cell inside a container and filling the electrolyte in the container.

39. The method according to example 38, wherein soaking the sandwich cell comprises filling argon in the container.

40. The method according to any of examples 36-39, wherein the electrolyte comprises lithium hexafluorophosphate ($LiPF_6$) in ethylene carbonate and dimethyl carbonate at a ratio of 1:1 (ethylene carbonate:dimethyl carbonate) by weight.

41. The method according to any of examples 36-39, wherein the electrolyte comprises lithium hexafluorophosphate ($LiPF_6$) in ethylene carbonate, ethyl methyl carbonate, methyl butyrate, and lithium difluoro(oxalate)borate (LiDFOB).

42. The method according to any of examples 36-41, wherein preparing the first positive electrode and the second positive electrode comprises coating a positive electrode slurry onto an aluminum foil.

43. The method according to example 42, wherein the positive electrode slurry comprises activated carbon, carbon black, carboxymethyl cellulose, and styrene-butadiene rubber.

44. The method according to example 43, wherein the mass ratio of the activated carbon (AC), the carbon black (CB), the carboxymethyl cellulose (CMC), and the styrene-butadiene rubber (SBR) of the activated carbon layer is 91:5:3:1 (AC:CB:CMC:SBR).

45. The method according to any of examples 36-44, wherein preparing the first positive electrode and the second positive electrode comprises pressing the first positive electrode and the second positive electrode through a roll press.

46. The method according to any of examples 36-45, wherein preparing the negative electrode comprises coating a negative electrode slurry onto both sides of a copper foil of the negative electrode.

47. The method according to example 46, wherein the negative electrode slurry comprises a hard carbon, styrene-butadiene rubber, and carboxymethyl cellulose.

48. The method according to example 47, wherein the mass ratio of the hard carbon (HC), the styrene-butadiene rubber (SBR), and the carboxymethyl cellulose (CMC) is 96:3:1 (HC:SBR:CMC).

49. The method according to any of examples 36-48, wherein forming the sandwich cell is performed in a dry room having a dew point of −40° C.

50. The method according to any of examples 36-49, further comprising degassing and sealing the soaked sandwich cell.

51. The method according to example 50, wherein sealing the soaked sandwich cell is performed by a vacuum sealer.

52. The method according to any of examples 36-51, further comprising drying the first positive electrode, the second positive electrode, and the negative electrode before forming the first lithium film and the second lithium film.

53. The method according to any of examples 36-52, wherein forming the first lithium film and the second lithium film on the negative electrode comprises:
   cutting a lithium film into a plurality of lithium pieces;
   placing the plurality of lithium pieces on the first and second surfaces of the negative electrode; and
   pressing the plurality of lithium pieces.

54. The method according to any of examples 36-53, wherein a thickness of each of the first positive electrode, the second positive electrode, and the negative electrode is no more than 50 μm.

55. The method according to any of examples 36-54, wherein a total thickness of the lithium ion capacitor is no more than 1.0 millimeter.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. An ultra-thin lithium ion capacitor, comprising:
   a first ultra-thin single-side positive electrode layer having a thickness of no more than 50 μm;
   a second ultra-thin single-side positive electrode layer having a thickness of no more than 50 μm;
   an ultra-thin double-side negative electrode layer having a thickness of no more than 50 μm disposed between the first and second positive electrode layers;
   a first ultra-thin lithium film source layer and a second ultra-thin lithium film source layer respectively uniformly pre-loaded on both surfaces of the negative electrode by optimized pressure;
   a plurality of separators respectively disposed between the electrode layers; and
   an organic solvent electrolyte comprising a lithium salt;
   wherein:
      a total thickness of the ultra-thin lithium ion capacitor is no more than 1.0 millimeter;
      the negative electrode comprises a negative electrode active material, and wherein the negative electrode active material comprises hard carbon, soft carbon, and graphite;
      the negative electrode comprises styrene butadiene rubber (SBR) and carboxymethyl cellulose (CMC) as binders;
      a mass ratio of SBR:CMC within each of the first positive electrode and the second positive electrode is in a range of from 3:1 to 1:3; and
      the ratio of the total mass of the negative electrode active material to the total mass of SBR and CMC is in a range of from 90:10 to 98:2.

2. The ultra-thin lithium ion capacitor according to claim 1, wherein each of the first positive electrode and the second positive electrode comprises a positive electrode active material, wherein the positive electrode active material comprises activated carbon.

3. The ultra-thin lithium ion capacitor according to claim 2, wherein the activated carbon has a surface area in a range of from 1000 $m^2$/g to 3000 $m^2$/g and a particle size $D_{50}$ of no more than 5 μm.

4. The ultra-thin lithium ion capacitor according to claim 2, wherein the positive electrode active material further comprises carbon black (CB) mixed with the activated carbon (AC), and wherein the mass ratio of AC:CB is in a range of from 90:10 to 99:1.

5. The ultra-thin lithium ion capacitor according to claim 4, wherein each of the first positive electrode and the second positive electrode comprises styrene butadiene rubber (SBR) and carboxymethyl cellulose (CMC) as binders, and wherein a mass ratio of SBR:CMC within each of the first positive electrode and the second positive electrode is in a range of from 3:1 to 1:3, and wherein the ratio of total mass of AC and CB to the total mass of SBR and CMC is in a range of from 85:15 to 98:2.

6. The ultra-thin lithium ion capacitor according to claim 1, wherein each of the first positive electrode and the second positive electrode comprises styrene butadiene rubber (SBR) and carboxymethyl cellulose (CMC) as binders, and wherein the mass ratio of SBR:CMC within each of the first positive electrode and the second positive electrode is in a range of from 3:1 to 1:3.

7. The ultra-thin lithium ion capacitor according to claim 1, wherein the negative electrode active material has a particle side $D_{50}$ of no more than 10 μm.

8. The ultra-thin lithium ion capacitor according to claim 1, wherein the ratio of a total thickness of active layers of the first and second positive electrodes to a total thickness of active layers of the negative electrode is in a range of from 1:2 to 3:1.

9. The ultra-thin lithium ion capacitor according to claim 1, wherein the ratio of a capacity of active layers of the first and second positive electrodes to active layers of the negative electrode is in a range of from 0.08 to 0.2.

10. The ultra-thin lithium ion capacitor according to claim 1, wherein the separators comprise at least one of cellulose, polypropylene (PP), and polyethylene (PE) based material.

11. The ultra-thin lithium ion capacitor according to claim 1, wherein a thickness of the each of the first ultra-thin lithium source layer and the second ultra-thin lithium source layer is in a range of from 2 μm to 20 μm.

12. The ultra-thin lithium ion capacitor according to claim 1, wherein an area of each of the first ultra-thin lithium source layer and the second ultra-thin lithium source layer is about 25% to about 100% of the area of the side of the negative electrode on which it is disposed.

13. The ultra-thin lithium ion capacitor according to claim 1, wherein a mass ratio percentage of the first ultra-thin lithium source layer to the side of the negative electrode on which it is disposed is in a range of from 7% to 14%, and wherein the mass ratio percentage of the second ultra-thin lithium source layer to the side of the negative electrode on which it is disposed is in a range of from 7% to 14%.

14. The ultra-thin lithium ion capacitor according to claim 1, wherein the organic solvent electrolyte comprises 1 M LiPF6 in ethylene carbonate (EC):ethyl methyl carbonate (EMC):methyl butyrate (MB) (20:20:60 by volume)+0.1M lithium difluoro(oxalate)borate (LiDFOB).

15. The ultra-thin lithium ion capacitor according to claim 1, wherein the organic solvent electrolyte is capable of operating at a temperature of −40° C.

16. A lithium ion capacitor, comprising:
a first positive electrode and a second positive electrode;
a negative electrode disposed between the first positive electrode and the second positive electrode;
a first lithium film source layer disposed between the first positive electrode and the negative electrode; and
a second lithium film source layer disposed between the second positive electrode and the negative electrode;
wherein:
each of the first lithium film and the second lithium film comprises an electrolyte;
a total thickness of the lithium ion capacitor is no more than 1.0 millimeter;
the negative electrode comprises a negative electrode active material, and wherein the negative electrode active material comprises hard carbon, soft carbon, and graphite;
the negative electrode comprises styrene butadiene rubber (SBR) and carboxymethyl cellulose (CMC) as binders;
a mass ratio of SBR:CMC within each of the first positive electrode and the second positive electrode is in a range of from 3:1 to 1:3; and
the ratio of the total mass of the negative electrode active material to the total mass of SBR and CMC is in a range of from 90:10 to 98:2.

17. The lithium ion capacitor according to claim 16, wherein the negative electrode comprises a copper layer, a first carbon layer between the first lithium film and the copper layer, and a second carbon layer between the second lithium film and the copper layer.

18. The ultra-thin lithium ion capacitor of claim 1 wherein the lithium film source layer has edges that were cut from a 20 μm roll of lithium film.

\* \* \* \* \*